(12) United States Patent
Okamura

(10) Patent No.: US 9,725,059 B2
(45) Date of Patent: Aug. 8, 2017

(54) VEHICLE COLLISION DETERMINATION APPARATUS

(71) Applicant: HONDA MOTOR CO., LTD., Tokyo (JP)

(72) Inventor: Kenyu Okamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 14/514,908

(22) Filed: Oct. 15, 2014

(65) Prior Publication Data

US 2015/0112552 A1    Apr. 23, 2015

(30) Foreign Application Priority Data

Oct. 18, 2013  (JP) ................. 2013-217033

(51) Int. Cl.
*B60R 21/0132*    (2006.01)

(52) U.S. Cl.
CPC ................. *B60R 21/0132* (2013.01)

(58) Field of Classification Search
None
See application file for complete search history.

(56) References Cited

U.S. PATENT DOCUMENTS

| | | | | |
|---|---|---|---|---|
| 5,732,374 A | * | 3/1998 | Ohm | B60R 21/013 701/45 |
| 6,167,335 A | * | 12/2000 | Ide | B60R 21/0132 701/45 |
| 6,324,454 B1 | * | 11/2001 | Obata | B60R 21/0132 701/45 |
| 6,353,782 B1 | * | 3/2002 | Kunimi | B60R 21/0132 701/45 |
| 6,426,567 B2 | * | 7/2002 | Ugusa | B60R 21/0132 701/45 |
| 6,540,255 B1 | * | 4/2003 | Blank | B60R 21/0132 701/45 |

(Continued)

FOREIGN PATENT DOCUMENTS

| | | |
|---|---|---|
| DE | 19848997 | 4/1999 |
| DE | 10325135 | 12/2004 |

(Continued)

OTHER PUBLICATIONS

Japanese Office Action with Partial English Translation dated Apr. 14, 2015, 6 pages.

(Continued)

*Primary Examiner* — John R Olszewski
*Assistant Examiner* — David Merlino
(74) *Attorney, Agent, or Firm* — Rankin, Hill & Clark LLP

(57) ABSTRACT

A vehicle collision determination apparatus includes: a first sensor provided in a front section of the vehicle; and a determination section which determines, on the basis of output of the first sensor, whether there has occurred front collision of the vehicle. The output of the first sensor has first acceleration in a backward direction of the vehicle and second acceleration in a rightward direction and/or a leftward direction, and the determination section determines severity of the front collision by use of an integrated value of the first acceleration and an integrated value of the second acceleration.

7 Claims, 12 Drawing Sheets

(56) References Cited

U.S. PATENT DOCUMENTS

| | | | |
|---|---|---|---|
| 6,647,331 B2* | 11/2003 | Imai | B60R 21/0132 701/45 |
| 6,748,307 B1* | 6/2004 | Sala | B60R 21/0132 701/45 |
| 6,816,766 B2* | 11/2004 | Sala | B60R 21/0132 701/45 |
| 7,424,354 B2* | 9/2008 | Shen | B60R 21/0132 701/45 |
| 9,457,752 B2* | 10/2016 | Okamura | B60R 21/0132 |
| 2004/0102883 A1* | 5/2004 | Sala | B60R 21/0132 701/45 |
| 2006/0009895 A1* | 1/2006 | Oishi | B60R 21/0132 701/45 |
| 2006/0069483 A1* | 3/2006 | Hayasaka | B60R 21/0132 701/45 |
| 2006/0095183 A1* | 5/2006 | Schuller | B60R 21/0132 701/45 |
| 2007/0114767 A1* | 5/2007 | Miyata | B60R 21/0132 280/735 |
| 2007/0124047 A1* | 5/2007 | Roelleke | B60R 21/013 701/45 |
| 2010/0256872 A1* | 10/2010 | Le | B60R 21/0132 701/46 |
| 2015/0266439 A1* | 9/2015 | Foo | B60R 21/0132 701/45 |

FOREIGN PATENT DOCUMENTS

| | | |
|---|---|---|
| DE | 102006021822 | 1/2007 |
| DE | 102005056203 | 6/2007 |
| DE | 10027192 | 9/2007 |
| DE | 102006030563 | 1/2008 |
| EP | 1995125 | 11/2008 |
| JP | H10-152014 | 6/1998 |
| JP | 2003-040077 | 2/2003 |
| JP | 2004-130842 | 4/2004 |
| JP | 2005-053341 | 3/2005 |
| WO | 00/41918 | 7/2000 |

OTHER PUBLICATIONS

German Search Report with English Translation dated Jan. 30, 2015, 16 pages.

* cited by examiner

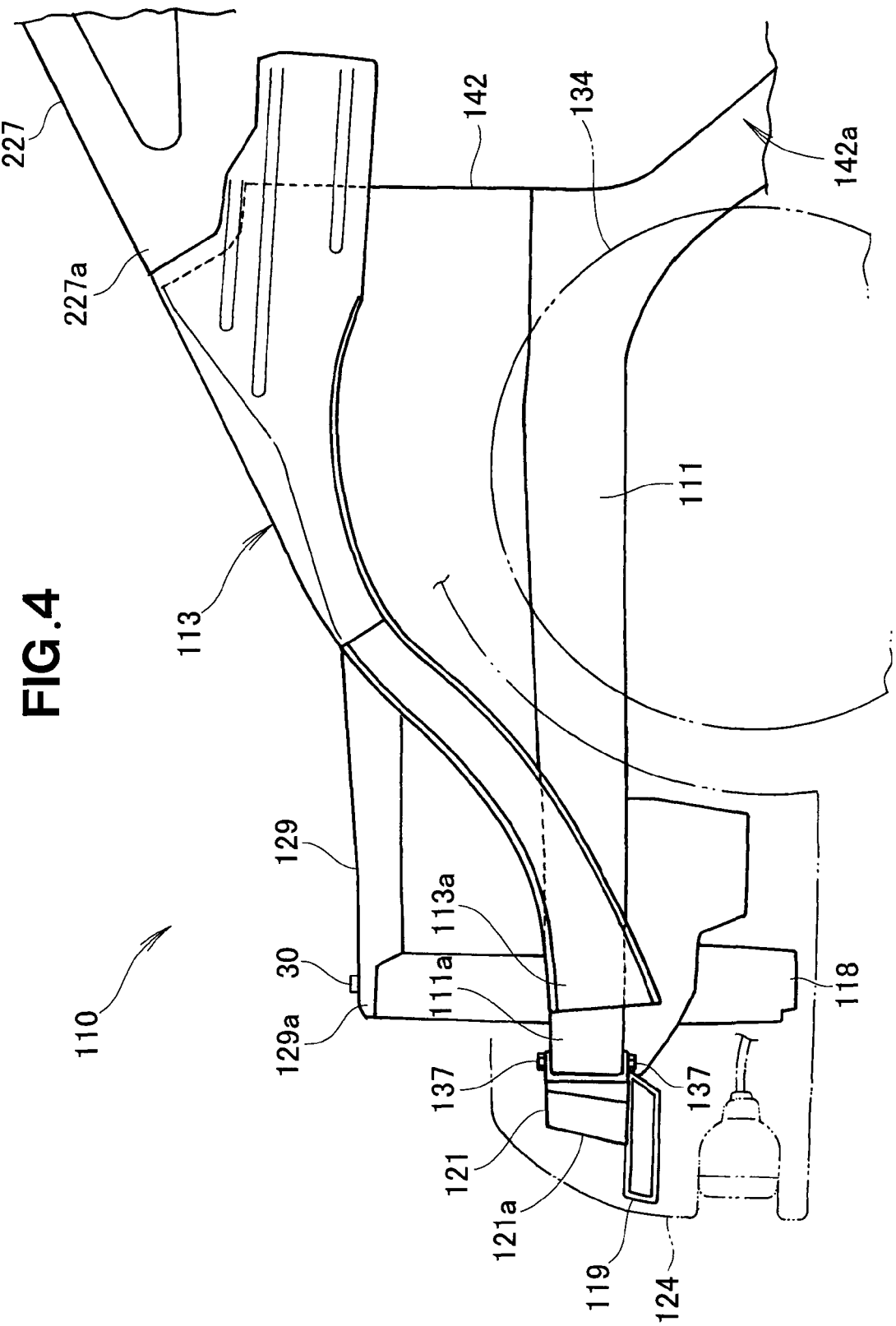

FIG.7A
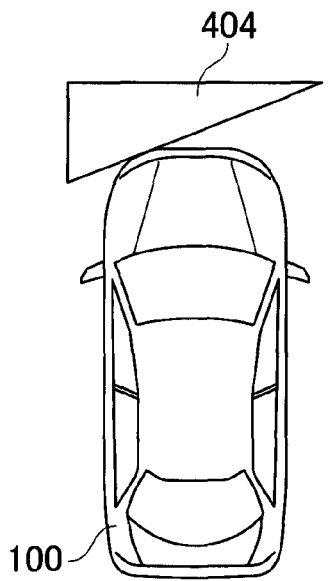
FIG.7B
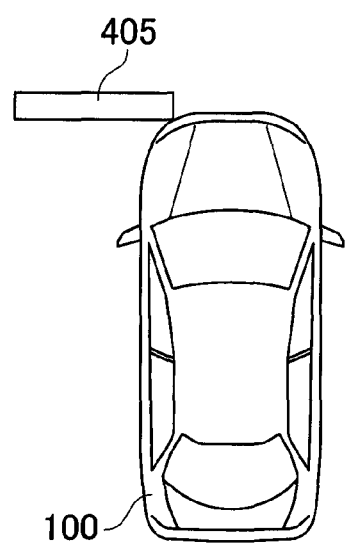
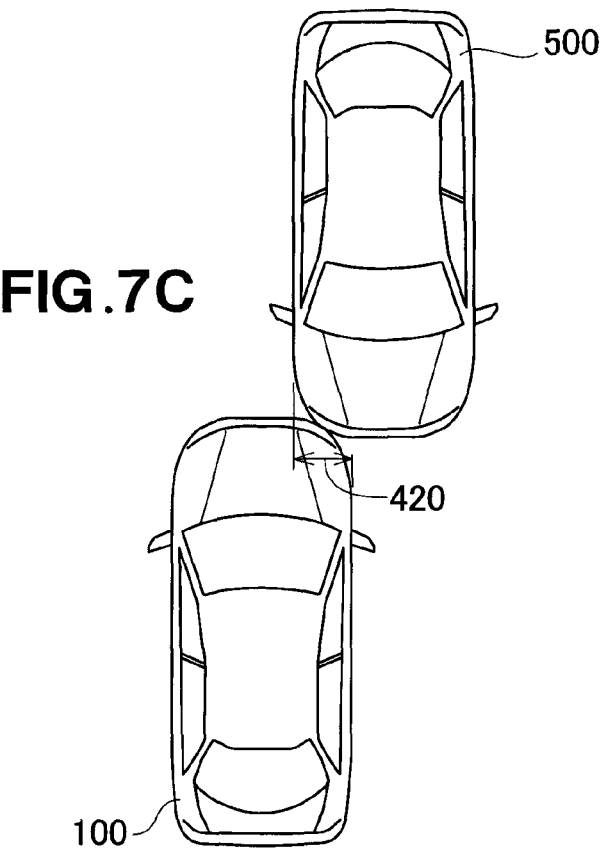
FIG.7C

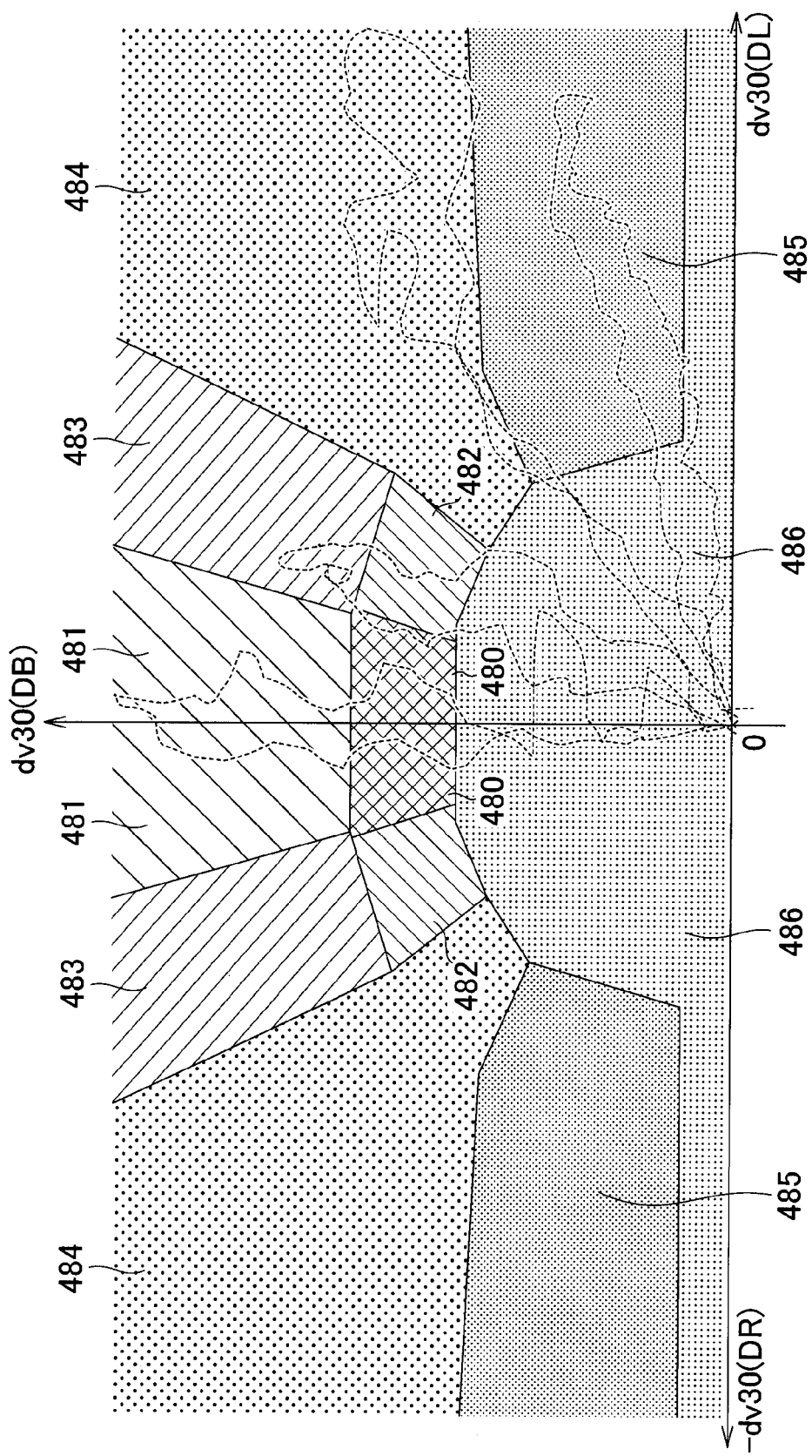

FIG.14
(A)
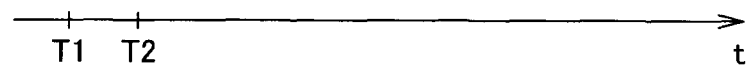
(B)
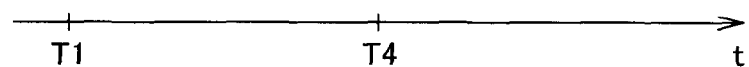
(C)
(D)
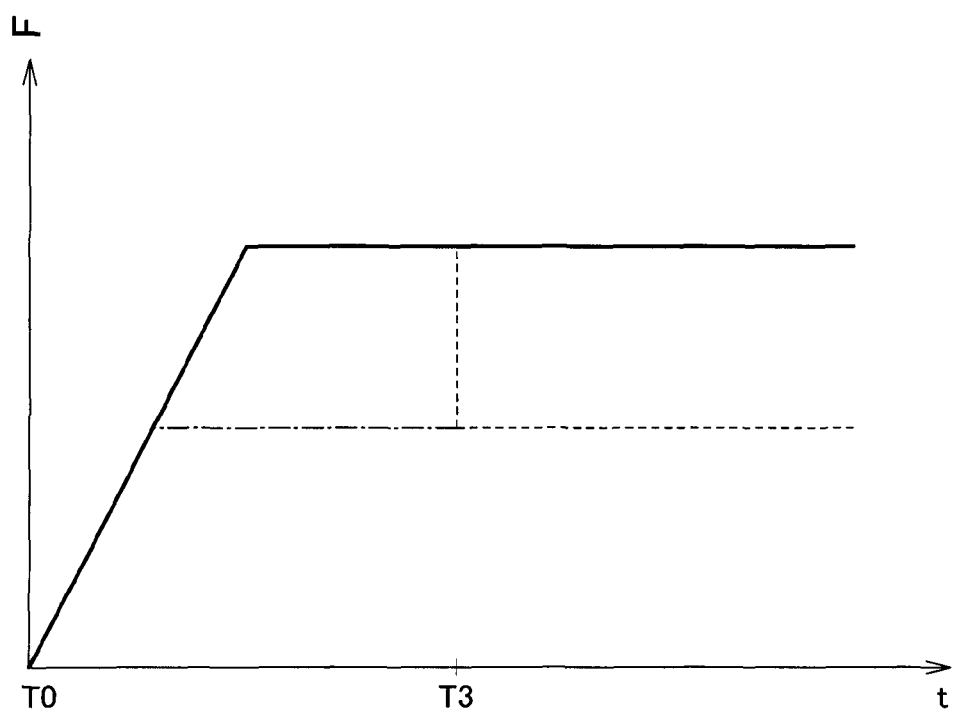

VEHICLE COLLISION DETERMINATION APPARATUS

FIELD OF THE INVENTION

The present invention relates to vehicle collision determination apparatus for determining crash or collision of a vehicle by use of a front sensor provided in a front section of the vehicle. The term "collision" is used herein to refer particularly to any one of various forms of front collision where a front portion, such as a front bumper face or a front fender, of a vehicle, collides with an obstacle, such as another vehicle or a barrier wall, and the term "determination" is used herein to refer particularly to any one of determinations as to severity and/or mode of front collision.

BACKGROUND OF THE INVENTION

Japanese Patent Application Laid-Open Publication No. 2004-130842 (hereinafter referred to as "Patent Literature 1") discloses, as a vehicle collision determination device, an airbag control section, which includes a leftward/rightward acceleration sensor, a forward/backward acceleration sensor and a CPU. Further, in FIG. 3 of Patent Literature 1, the leftward/rightward acceleration sensor and the forward/backward acceleration sensor incorporated in the airbag control section are disposed in a central section or a passenger compartment of an automobile. Output of a combination of leftward/rightward acceleration sensor and the forward/backward acceleration sensor, which is to be used by the CPU for determining whether there has occurred frontal collision (front-surface type front collision) where the front surface or front bumper face of the automobile collides with another automobile, is provided as two-axis or biaxial output. Thus, the airbag control section can determine a form or mode of frontal collision.

More specifically, FIG. 10 of Patent Literature 1 shows a deployment control map (i.e., collision-mode determining two-dimensional map), and paragraph [0048] of Patent Literature 1 discloses that the airbag control section determines a mode of frontal collision to be asymmetric frontal collision if coordinates determined by a forward/backward total integrated value obtained by integrating the output of the forward/backward acceleration sensor and a leftward/rightward sectional integrated value obtained by sectionally integrating the output of the leftward-rightward acceleration sensor fall within a predetermined region (hatched region) in FIG. 10. In Patent Literature 1, the term "asymmetric frontal collision" embraces "automobile-to-automobile offset frontal collision" and "automobile-to-automobile oblique frontal collision" (i.e., automobile-to-automobile frontal collision where a portion (e.g., left portion) of the front surface of the automobile collides with a portion (e.g., left portion) of the front surface of another automobile).

In the case where the mode of the frontal collision is the asymmetric frontal collision, the above-mentioned airbag control section selects, for example, a low map deployment region from deployment regions (i.e., airbag-deployment-timing determining two-dimensional map) and outputs a deployment instruction for deploying frontal collision airbags (i.e., airbags for driver's and assistant driver's seats) when coordinates determined by the forward/backward total integrated value and a forward/backward sectional integrated value obtained by sectionally integrating the output of the forward/backward acceleration sensor fall within the selected low map portion.

Alternatively, until the coordinates determined by the forward/backward total integrated value and the leftward/rightward sectional integrated value fall within the above-mentioned hatched region, the airbag control section determines that the mode of the frontal collision is not the asymmetric frontal collision, i.e. that a symmetric frontal collision could occur. Here, the term "symmetric frontal collision" embraces "automobile-to-automobile full-wrap frontal collision" (i.e., automobile-to-automobile frontal collision where the entire front surface of the automobile collides with the entire front surface of another automobile) shown in (1-1) of FIG. 10. The airbag control section selects, for example, a high map deployment region from among the above-mentioned deployment regions, and when the coordinates determined by the forward/backward total integrated value and the forward/backward sectional integrated value fall within the high map deployment region, the airbag control section determines that the mode of the frontal collision is the symmetric frontal collision and outputs a deployment instruction for deploying the frontal collision airbags.

Namely, the airbag control section disclosed in Patent Literature 1 merely determines single timing for deploying the frontal collision airbags in accordance with the mode of the frontal collision. In other words, the airbag control section disclosed in Patent Literature 1 does not determine severity of the frontal collision. Further, although the airbag control section disclosed in Patent Literature can determine the "automobile-to-automobile offset frontal collision" and "automobile-to-automobile oblique frontal collision", it cannot determine other modes of frontal collision, such as ODB (Offset Deformable Barrier) frontal collision where a part of the front surface of the automobile collides, for example, with a honeycomb structure provided on a concrete wall, and side-surface type front collision other than the front-surface type front collision. Here, the term "side-surface type front collision" embraces automobile-to-automobile intersecting side-surface type front collision where, for example, a front fender or engine room of the vehicle collides with a part of the front surface of another vehicle as the two vehicles enter an intersection.

The airbag control section disclosed in Patent Literature 1 or the deployment control map (collision-mode determining two-dimensional map) disclosed in FIG. 10 of Patent Literature 1 is an improvement of an airbag operating apparatus (vehicle collision determination apparatus) disclosed in FIG. 1 of Japanese Patent Application Laid-open Publication No. 2003-040077 (hereinafter referred to as "Patent Literature 2") or a determining map (collision-mode determining two-dimensional map) disclosed in FIG. 3 of Patent Literature 2. According to paragraphs [0004] and [0005] of Patent Literature 2, the airbag operating apparatus (corresponding to the airbag control section in Patent Literature 1) includes electronic left and right sensors, in place of the mechanical left and right sensors (two forward/backward impact sensors) for detecting collision in the forward/backward direction in Patent Literature 1. Thus, the airbag operating apparatus disclosed in Patent Literature 2 or the airbag control section disclosed in Patent Literature 1 cannot determine severity of frontal collision, because severity of frontal collision is determined by use of output of mechanical left and right sensors as seen in an electronic control unit (vehicle collision determination device) or a severity determination section of FIG. 1 in Japanese Patent Application Laid-open Publication No. 2005-053341 (hereinafter referred to as "Patent Literature 3").

FIG. 1 of Patent Literature 3 discloses electronic front sensors (two forward/backward acceleration sensors) provided in a front section of a vehicle, and FIG. 5 of Patent Literature 3 discloses a severity determining map or a floor deceleration reference value (one-dimensional threshold value). According to paragraphs [0039] and [0040] of Patent Literature 3, the severity determination section determines that severity is low if speed variation (namely, forward/backward sectional integrated value obtained by sectionally integrating output (deceleration) of an electronic floor sensor (forward/backward acceleration sensor) provided in a central section of the vehicle) exceeds the floor deceleration reference value before output of the front sensors exceeds a reference value (i.e., the front sensors are turned on) (see solid line in FIG. 5 of Patent Literature 3).

Further, FIG. 1 of Patent Literature 3 shows a multi (e.g., dual)-stage airbag having two inflators, and FIG. 6 of Patent Literature 3 shows a diagram (table) explanatory of delay times from first deployment timing for initially or first deploying the airbag to second deployment timing succeeding the first deployment timing. When severity of frontal collision is low, for example, the delay time is set at 30 ms. In other words, the airbag control section disclosed in Patent Literature 1 and the electronic control unit disclosed in Patent Literature 3, which cannot determine severity of frontal collision, cannot control a multi-stage airbag having a plurality of inflators.

SUMMARY OF THE INVENTION

In view of the foregoing prior art problems, it is an object of the present invention to provide an improved vehicle collision determination apparatus which can protect a vehicle occupant more properly. Other objects of the present invention will become apparent to a person skilled in the art with reference to the following illustrative description of preferred embodiments and the accompanying drawings.

According to a first aspect of the present invention, there is provided a vehicle collision determination apparatus, which comprises: a first sensor provided in a front section of the vehicle; and a determination section which determines, on the basis of output of the first sensor, whether there has occurred front collision of the vehicle, the output of the first sensor having first acceleration in a backward direction of the vehicle and second acceleration in a rightward direction and/or a leftward direction, the determination section determining severity of the front collision by use of an integrated value of the first acceleration and an integrated value of the second acceleration.

According to the first aspect, the output of the first sensor has (is indicative of) the first acceleration in the backward direction of the vehicle and the second acceleration in the rightward direction and/or the leftward direction. In other words, the output of the first sensor is provided as two-axis or biaxial output. Further, because such a first sensor is provided in the front section of the vehicle, the determination section can determine severity of the front collision by use of the integrated value of the first acceleration and the integrated value of the second acceleration, for example, by checking whether coordinates determined by these integrated values exceed a two-dimensional threshold value within a two-dimensional map. In the context of the present invention, the term "front collision" embraces not only "frontal collision (front-surface type front collision)" where a front surface region (e.g., front bumper face) of the front section of the vehicle collides with an obstacle but also "side-surface type front collision" where a side surface region (e.g., front fender) of the front section of the vehicle collides with an obstacle. Because the severity of the front collision can be determined as above, the vehicle collision determination apparatus of the present invention can protect a vehicle occupant more properly by using the determined severity for control of an airbag, a webbing, etc.

According to a second aspect, the determination section determines a mode of the front collision. More specifically, the determination section determines, for example, which one of regions within the two-dimensional map the coordinates determined by the integrated value of the first acceleration and the integrated value of the second acceleration belong to and thereby determines a mode corresponding to that region. Thus, the vehicle collision determination apparatus of the present invention can distinguish between the front-surface type front collision and the side-surface type front collision. Further, the vehicle collision determination apparatus of the present invention can distinguish between an automobile-to-automobile oblique frontal collision and an ODB (Offset Deformable Barrier) frontal collision belonging to the frontal collision (front-surface type front collision). As a result, the vehicle collision determination apparatus of the present invention can protect the vehicle occupant even more properly in accordance with the mode of the front collision.

According to a third aspect, the vehicle collision determination apparatus further comprises a second sensor provided in a passenger compartment of the vehicle, output of the second sensor having third acceleration in the backward direction and fourth acceleration in the rightward direction and/or the leftward direction. Upon determination that the mode of the front collision is a predetermined mode, the determination section determines the severity of the front collision by use of an integrated value of the third acceleration and an integrated value of the fourth acceleration.

Depending on the mode of the front collision, it may sometimes be difficult for the determination section to accurately determine severity of the front collision using the integrated value of the first acceleration and the integrated value of the second acceleration. For example, severity of vs.-barrier-wall oblique frontal collision where a part of the front surface of the vehicle collides obliquely with a barrier wall, such as a concrete wall, depends, for example, on a friction coefficient of the barrier wall, speed of the vehicle, etc. Further, severity of automobile-to-automobile offset frontal collision depends on a length or range of a part of the front surface of the vehicle (first vehicle) colliding with another vehicle (second vehicle), speed of the vehicle, etc. Furthermore, severity of automobile-to-automobile oblique frontal collision depends on an angle of a traveling direction of another vehicle (second vehicle), colliding with the vehicle (first vehicle), relative to the traveling direction of the vehicle (first vehicle), speed of the vehicle, etc.

According to the third aspect, when the front collision mode of the vehicle is the predetermined mode, the determination section can use the bi-axial output (i.e., integrated value of the third acceleration and integrated value of the fourth acceleration) of the second sensor. Because such a floor sensor is provided in the passenger compartment of the vehicle, the determination section can readily determine severity of the front collision using the integrated value of the third acceleration and the integrated value of the fourth acceleration, for example, by checking whether or not coordinates determined by these two integrated values exceed a two-dimensional threshold value within a two-dimensional map. In other words, although the determination section may always determine the severity of the predetermined mode to be high when the front collision mode of the vehicle is the predetermined mode, it is preferable that the determination section determine severity of the predetermined mode using the output of the second sensor.

According to a fourth aspect, the determination section determines, in accordance with the mode of the front collision, one corresponding timing of a plurality of timing, the determination section determines, by use of the integrated value of the third acceleration, whether current time is the one timing corresponding to the determined mode, and the one timing corresponding to the determined mode is first deployment timing for first deploying an airbag associated with a driver's seat and/or an airbag associated with an assistant driver's seat.

According to the fourth aspect, the determination section can determine, in accordance with the mode of the front collision, the first (initial) deployment timing for first or initially deploying the airbag. In this way, the vehicle collision determination apparatus of the present invention can properly set start timing of protecting force of the airbag in accordance with the mode of the front collision.

According to the fifth aspect, the determination section determines second deployment timing, succeeding the first deployment timing, in accordance with the severity of the front collision determined by use of the integrated value of the third acceleration and the integrated value of the fourth acceleration.

According to the fifth aspect, the determination section can determine the second deployment timing in accordance with the severity of the front collision. As a result, the vehicle collision determination apparatus of the present invention can properly set hardness or inner pressure (protecting force) of the airbag in accordance with the severity of the front collision.

According to a sixth aspect, the determination section determines, in accordance with the severity of the front collision, one corresponding restraining force of a plurality of restraining force, and the one restraining force corresponding to the determined severity is generated while a webbing provided in the vehicle is restraining a vehicle occupant following occurrence of the front collision. Thus, in accordance with the severity of the front collision, the determination section can more properly set restraining force (protecting force) with which the webbing retrains the vehicle occupant.

According to a seventh aspect, the determination section determines the mode of the front collision by use of the integrated value of the first acceleration and the integrated value of the second acceleration.

According to the seventh aspect, the determination section determines, for example, which one of regions within a two-dimensional map coordinates determined by the integrated value of the first acceleration and the integrated value of the second acceleration belongs to and thereby determines a mode corresponding to that region. In a case where the term "front collision" embraces frontal collision (front-surface type front collision) and side-surface type front collision, the vehicle collision determination apparatus of the present invention can distinguish between the front-surface type front collision and the side-surface type front collision. Thus, the vehicle collision determination apparatus of the present invention can more properly protect a vehicle occupant in accordance with the mode of the front collision.

According to an eighth aspect, the determination section determines, in accordance with the mode of the front collision, whether a side airbag provided in the vehicle should be deployed or not. The side airbag can be deployed in accordance with the mode of the front collision. Because it is preferable to deploy the side airbag depending on the mode of the front collision, the vehicle collision determination apparatus of the present invention can more properly protect the vehicle occupant with the side airbag.

According to a ninth aspect, the determination section determines timing for deploying the side airbag in accordance with the mode of the front collision. Thus, the vehicle collision determination apparatus of the present invention can more properly set start timing of protecting force of the side airbag in accordance with the mode of the front collision.

According to a tenth aspect, the vehicle collision determination apparatus further comprises a third sensor provided in a side section of the vehicle, and the determination section determines, in accordance with the mode of the front collision, whether deployment of the side airbag should be inhibited or not.

According to the tenth aspect, the determination section can inhibit deployment of the side airbag in accordance with the mode of the front collision. Depending on the mode of the front collision mode, it is not preferable to deploy the side airbag on the basis of output of the third sensor, and thus, the vehicle collision determination apparatus of the present invention can avoid the side airbag from being deployed erroneously. Alternatively, when deployment of the side airbag is not inhibited, the vehicle collision determination apparatus of the present invention can use the output of the third sensor to even more properly set the start timing of the protecting force of the airbag.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 4 is a side view of the vehicle showing the example construction of FIG. 3 and an example mounted position of a front sensor;

FIGS. 7A, 7B and 7C show various example front collision modes for which the likelihood of the severity of front collision of the vehicle becoming high is medium;

FIG. 9 shows an example of a two-dimensional map for determining severity and mode of front collision;

FIG. 14 shows examples of airbag control corresponding to severity of front collision and example webbing control corresponding to severity of front collision.

DETAILED DESCRIPTION OF THE INVENTION

The following will describe preferred embodiments of the present invention in order to facilitate understanding of the basic principles of the invention, but it should be appreciated that the present invention is not limited to the described embodiments.

Figure 1:
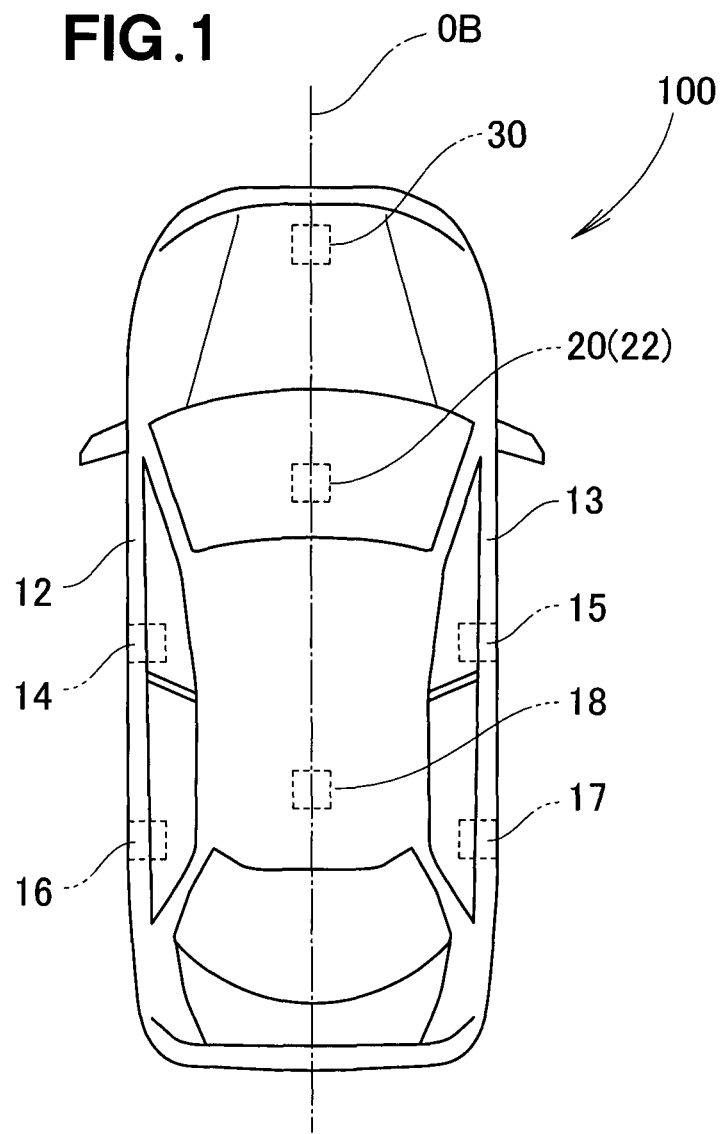
FIG. 1 is a plan view showing a vehicle employing an embodiment of a vehicle collision determination apparatus and more particularly an example arrangement of a plurality of sensors provided in the vehicle.

FIG. 1 is a plan view showing a vehicle (e.g., automobile) 100 employing an embodiment of a vehicle collision determination apparatus and more particularly showing an example arrangement of a plurality of sensors provided in the vehicle 100. As shown in FIG. 1, a front sensor (first sensor) 30 is provided in a front section of the vehicle 100. The vehicle 100 includes a vehicle collision determination unit 20 for determining collision of the vehicle 100, and the vehicle collision determination unit 20 is provided in a central section of the vehicle 100. The vehicle collision determination unit 20, which may be provided on the floor of a passenger compartment of the vehicle 100, has a floor sensor (second sensor) 22 of FIG. 2 incorporated therein. Although the unit 20 of FIG. 1 may determine, on the basis of output of the front sensor 30 alone, whether front collision of the vehicle 100 has occurred or not, the unit 20 in the illustrated example determines, on the basis of output of the front sensor 30 and output of the floor sensor 22, whether front collision has occurred.

Figure 2:
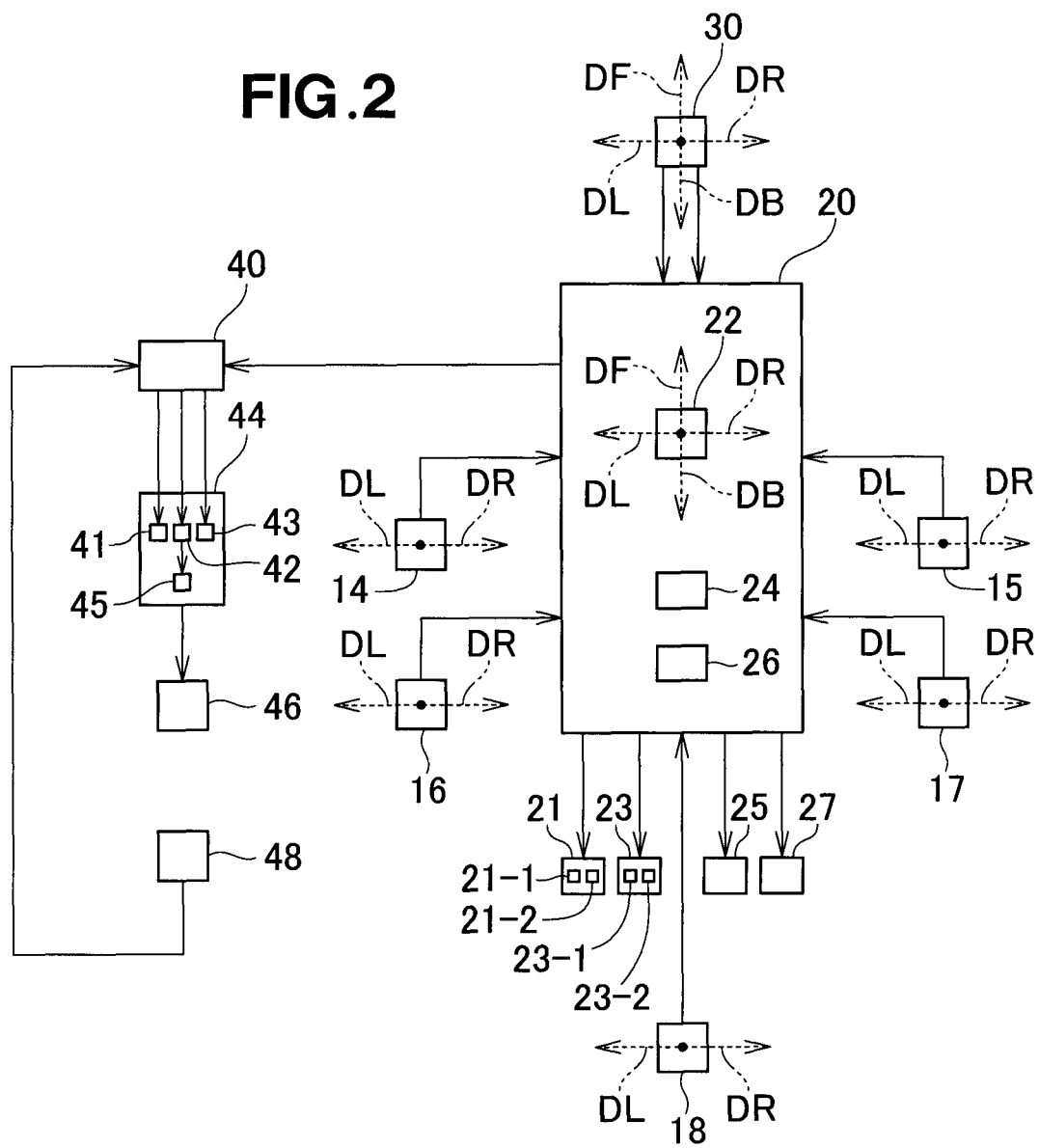
FIG. 2 is a block diagram showing an example construction of an embodiment of the vehicle collision determination apparatus of the present invention.

Note that the floor sensor 22 of FIG. 2 may be provided in the passenger compartment outside the vehicle collision determination unit 20, such as on a not-shown instrument panel or steering wheel. Alternatively, the vehicle collision determination unit 20 having the floor sensor 22 incorporated therein may be provided other than on the floor of the passenger compartment, such as on the not-shown instrument panel or steering wheel. The floor sensor (second sensor) 22 may also be called a central sensor or a unit sensor.

In the context of the present invention, the term "front collision", which refers generally to collision where the front portion of the vehicle 100, embraces not only "frontal collision (front-surface type front collision)" where the front surface of a front portion of the vehicle 100 collides with an obstacle but also "side-surface type front collision" where a side surface of the front portion of the vehicle 100 collides with an obstacle. Thus, the vehicle collision determination unit 20 not only controls the airbags associated with the driver's seat and assistant driver's seat on the basis of output of the front sensor 30 (and output of the floor sensor 22), but also preferably controls side airbags (including side-curtain airbags). More preferably, the vehicle collision determination unit 20 controls the side airbags on the basis of output of satellite impact sensors (third sensors) 14, 15, 16 and 17 provided on lateral sides of the vehicle 100.

Note that the vehicle collision determination unit 20 can deploy any of the side airbags on the basis of output of the front sensor 30 (and output of the floor sensor 22) independently of output of the satellite impact sensors (third sensors) 14, 15, 16 and 17. Conversely, the vehicle collision determination unit 20 can deploy any of the side airbags on the basis of the output of the satellite impact sensors (third sensors) 14, 15, 16 and 17 independently of the output of the front sensor 30 (and output of the floor sensor 22).

The vehicle 100 of FIG. 1 may further include a satellite safing sensor 18 that is disposed on the centerline 0B of the vehicle 100. The vehicle collision determination unit 20 can use output of the satellite safing sensor 18, so that the unit 20 can determine even more appropriately whether or not to deploy any of the side airbags.

Note, however, that the vehicle 100 of FIG. 1 need not necessarily include the satellite safing sensor 18. Namely, FIG. 1 merely shows an illustrative embodiment of the vehicle collision determination apparatus, and the vehicle 100 may be provided with at least one of the sensors 30, 22, 14, 15, 16, 17 and 18 depending on at least one object of the present invention, and the vehicle collision determination unit 20 can use output of the at least one of the sensors 30, 22, 14, 15, 16, 17 and 18.

FIG. 2 shows an example construction of the embodiment of the vehicle collision determination apparatus of the present invention. The embodiment of the vehicle collision determination apparatus includes the front sensor (first sensor) 30 and the vehicle collision determination unit 20. Although the vehicle collision determination unit 20 shown in FIG. 2 includes the floor sensor (second sensor) 22, it need not necessarily include such a floor sensor 22. In other words, the embodiment of the vehicle collision determination apparatus may comprise, for example, the front sensor 30 and a determination section 24 of the vehicle collision determination unit 20. The determination section 24 can determine, on the basis of output of the front sensor 30, whether front collision of the vehicle 100 has occurred or not.

As shown in FIG. 2, the output of the front sensor 30 is provided as two-axis or biaxial output. More specifically, the output of the front sensor 30 has both first acceleration in the forward direction DF and backward direction DB of the vehicle 100 and second acceleration in the rightward direction DR and leftward direction DL of the vehicle 100. Note, however, that the first acceleration in the forward direction DF and backward direction DB may be replaced with the first acceleration only in the backward direction DB (i.e., deceleration a30), and that the second acceleration in the rightward direction DR and leftward direction DL may be replaced with the second acceleration only in the rightward direction DR or only in the leftward direction DL.

With the biaxial front sensor 30 provided in the front section of the vehicle 100, the determination section 24 can determine severity of front collision by use of an integrated value of the first acceleration (deceleration a30) and an integrated value of the second acceleration. Because severity of front collision can be determined like this, the embodiment of the vehicle collision determination apparatus can protect vehicle occupants more properly by using the determined severity of front collision for control of an airbag module 21 associated with the driver's seat and an airbag module 23 associated with the assistant driver's seat. Further, the determination section 24 can output the determined severity of front collision to control units 40 of seat belt devices, and thus, the embodiment of the vehicle collision determination apparatus can protect a vehicle occupant even more properly by use of a webbing 46 of the seat belt device. In the case where the vehicle 100 includes the seat belt devices or the control units 40 and where the vehicle collision determination unit 20 controls the airbag modules 21 and 23, the vehicle collision determination apparatus or the vehicle collision determination unit 20 can be called an SRS (Supplemental Restraint System) or SRS unit. Of course, the control unit 40 and the SRS unit may be implemented by a single ECU; in other words, belt winding devices 44, the airbag modules 21 and 23, etc. can be controlled by the single ECU.

Further, the determination section 24 of FIG. 2 can determine a mode of the front collision in addition to, or in place of, the severity of the front collision, by use of the integrated value of the first acceleration (deceleration a30) and the integrated value of the second acceleration. Thus, the determination section 24 can distinguish between the front-surface type front collision and the side-surface type front collision. The instant embodiment of the vehicle collision determination apparatus can protect the vehicle occupants even more appropriately in accordance with the determined mode of the front collision.

Referring to FIG. 2, the determination section 24 preferably uses the output of the floor sensor (second sensor) 22 as well. More preferably, the determination section 24 also uses the output of the other sensors 14, 15, 16, 17 and 18. Advantageous benefits achievable by using the output of the other sensors 14, 15, 16, 17 and 18 will be discussed later.

Figure 3:
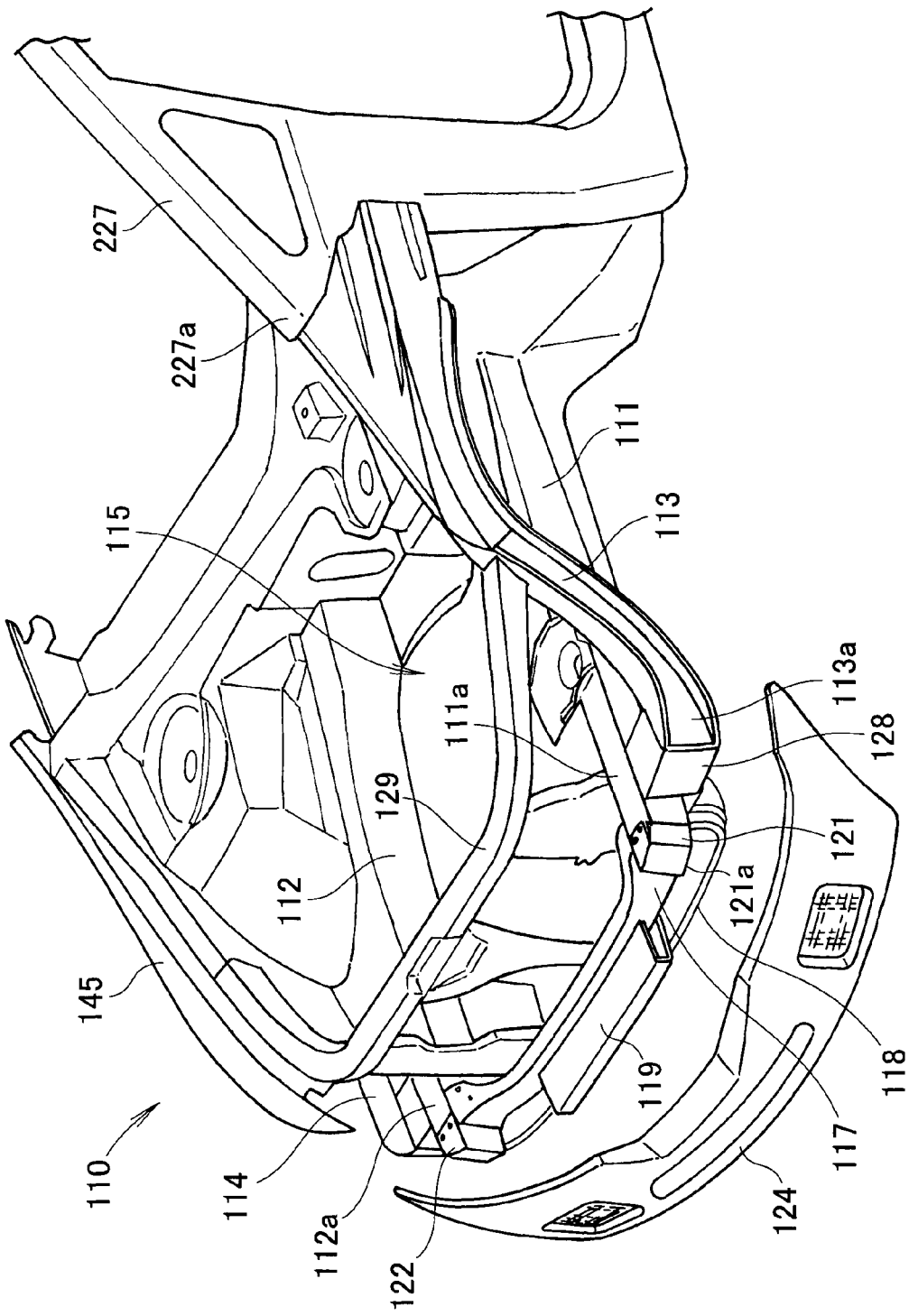
FIG. 3 is a perspective view showing an example construction of a front section of the vehicle of FIG. 1.

FIG. 3 is a perspective view showing an example construction of the front section of the vehicle 100 of FIG. 1. The front sensor 30 of the vehicle 100 is provided at a desired position in the front section 110 of the vehicle 100 shown in FIG. 3. Thus, once there occurs front collision where the front section 110 of the vehicle 100 collides with an obstacle, the front sensor 30 can detect the front collision earlier than the other sensors 22, 14, 15, 16, 17 and 18. In other words, because the front section 110 of the vehicle 100 can absorb energy of the front collision, it is more difficult for the other sensors 22, 14, 15, 16, 17 and 18 to detect severity and/or a mode of the front collision than the front sensor 30.

In the illustrated example of FIG. 3, the front section 110 of the vehicle 100 includes a front body, and a panel provided on the front body. Referring to FIG. 3, the panel provided on the front body includes a right side fender 145 forming a side surface of the front section 110, and a front bumper face 124 forming the front surface of the front section 110. Further, a left side panel or a front pillar (A pillar) 227 is disposed next to the front section 110 of the vehicle 100 or a left upper member 113.

Further, as shown in FIG. 3, the front section 110 of the vehicle 100 includes a left front side frame 111 and a right side frame 112. The left front side frame 111 and the right side frame 112 are interconnected by a bumper beam 117 disposed between front end portions 111a and 112a of the left and right side frames 111 and 112. Further, in FIG. 3, the left front side frame 111 or the front end portion 111a includes a left extension member 121, and the bumper beam 117 includes a center extension member 119 centrally thereon. The front bumper face 124 is disposed in front of the bumper beam 117 or the center extension member 119.

Further, as shown in FIG. 3, the left upper member 113 is disposed outwardly of the left front side frame 111 and connected to the left side frame 111 via a connection member 128. The left upper member 113 extends from the connection member 128, upwardly and rearwardly above the left front side frame 111, to a lower end portion 227a of the left front pillar 227. A load applied, for example, to a front end portion 113a of the left upper member 113 is transmitted to the left front pillar 227.

Further, as shown in FIG. 3, the left and right front side frames 111 and 112 and the left and right upper members 113 and 114 together constitute a framework of a drive section compartment like an engine room 115, and a bulkhead defining a boundary of the engine room 115 includes an upper frame 129 and a front lower cross member 118. A not-shown radiator etc. are mounted on the bulkhead, and thus, the bulkhead can be called a radiator support section. Further, the left and right front side frames 111 and 112 can support a not-shown engine etc.

FIG. 4 is a side view showing an example construction of the front section 110 of the vehicle 100 and an example mounted position of the front sensor 30. As shown in FIG. 4, the front sensor 30 is mounted, for example, on a distal end portion 129a or front portion of the upper frame 129 of the bulkhead. When a load has been applied to the front bumper face 124, the front bumper face 124, the center extension member 119, the left extension member 121, etc. first deform, and then, the left front side frame 111, the left extension member 121, etc. deform, followed by deformation of the bulkhead's upper frame 129 etc. The left extension member 121 is connected to the front end portion 111a of the left front side frame 111, for example, by means of bolts 37.

Because the front end portion 111a of the left front side frame 111 deforms before the bulkhead's upper frame 129 starts deforming, the front sensor 30 mounted, for example, on the upper frame 129 can detect the deformation of the bulkhead's upper frame 129 (and hence frontal collision of the vehicle 100); besides, the front sensor 30 is difficult to collapse. The left front side frame 111 can absorb energy of front collision of the vehicle 100, and a load having been applied to the front end portion 111a of the left front side frame 111 is transmitted, for example, to a dash panel 142 or lower dash panel 142a. The dash panel 142 partitions between the engine room 115 and the passenger compartment of the vehicle 100.

Further, referring to FIG. 3, when a load has been applied to the right front fender 145, for example, the right upper member 114, the right front side frame 112, etc. first deform, and then, the bulkhead's upper frame 129 etc. deform. Thus, the front sensor 30 mounted, for example, on the upper frame 129 can detect the deformation of the bulkhead's upper frame 129 (and hence side-surface frontal collision of the vehicle 100); besides, the front sensor 30 is difficult to collapse. The front sensor 30 of FIG. 4 is preferably disposed on the centerline 0B of the vehicle 100, and thus, the single front sensor 30 can more appropriately detect side-surface frontal collision of the vehicle 100.

Figure 5A:
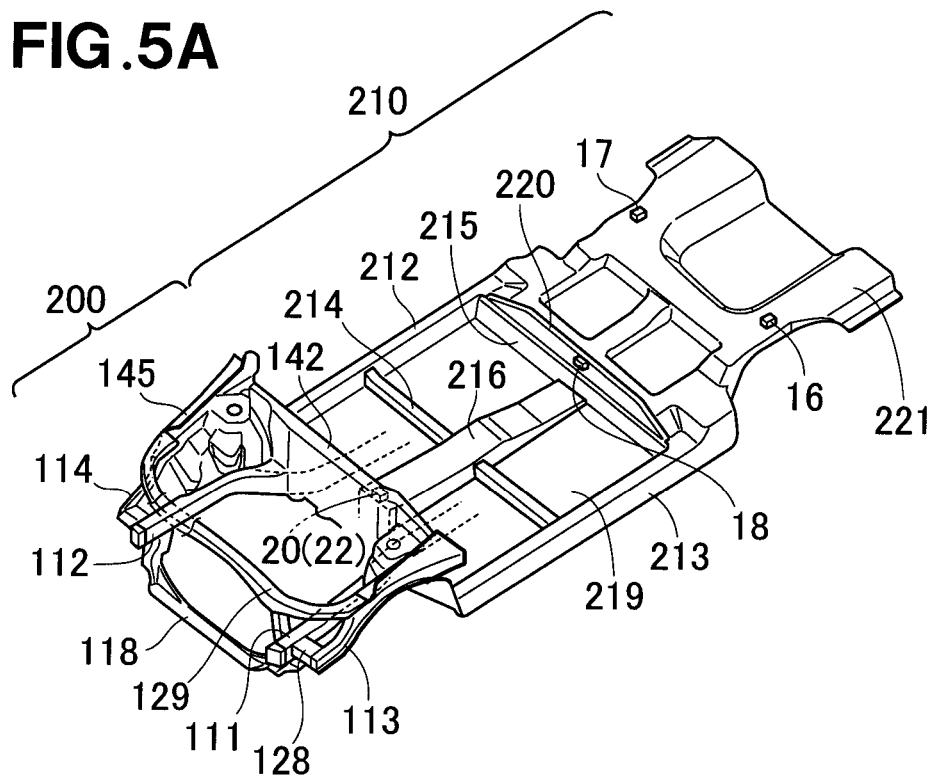
FIG. 5A is a perspective view showing an example construction of a vehicle body framework of the vehicle of FIG. 1 and an example arrangement of a floor sensor, rear satellite impact sensors and a satellite safing sensor.
Figure 5B:
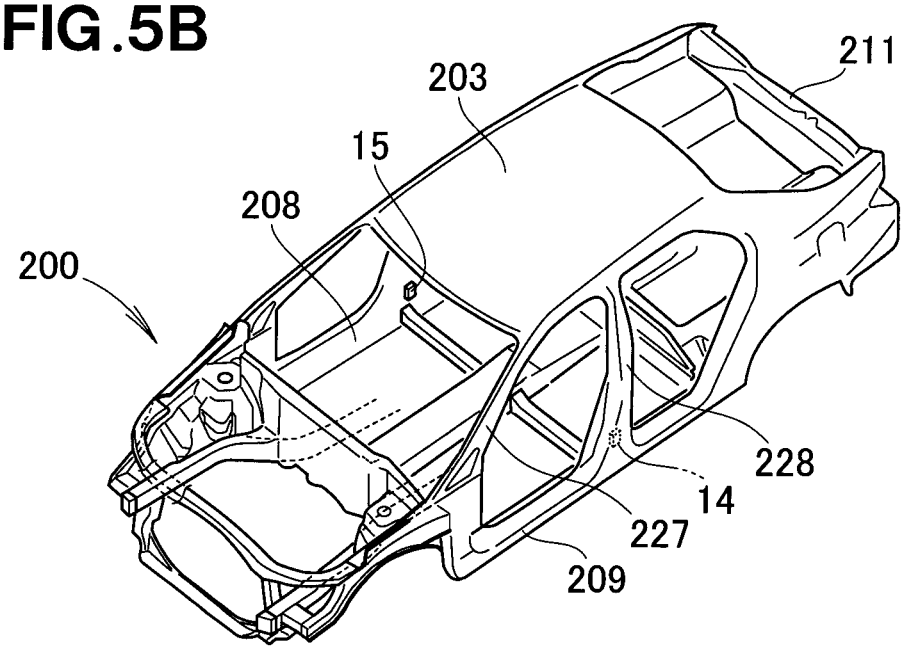
FIG. 5B is a perspective view showing an example construction of a primary body section of the vehicle of FIG. 1 and an example arrangement of front satellite impact sensors.

FIG. 5A is a perspective view showing an example construction of a vehicle body framework of the vehicle 100 and an example arrangement of the floor sensor 22, the rear satellite impact sensors 16 and 17 and the satellite safing sensor 18, and FIG. 5B is a perspective view showing an example construction of a primary vehicle body section of the vehicle 100 and an example of the front satellite impact sensors 14 and 15. As shown in FIG. 5A, the body of the vehicle 100 includes a front body section 200 and a floor body (rear body) section 210. Further, the vehicle body framework of the vehicle 100 includes, in addition to the left and right front side frames 111 and 112, the bulkhead's upper frame 129, the bulkhead's front lower cross member 118, the dash panel 142, etc., left and right side sills 213 and 212, a middle cross member 214, a center cross member 215, a center tunnel 216, etc.

The floor body section 210 shown in FIG. 5A includes a front floor 219 and a rear floor 221, and the left and right side frames 111 and 112 are each connected, via the dash panel 142, to the floor body section 210 (e.g., the front floor 219 and corresponding one of the side sills 212 and 213). Thus, a load applied to the left and right front side frames 111 and 112 can be dispersed.

As shown in FIG. 5A, the floor sensor 22 incorporated in the vehicle collision determination unit 20 is fixed to the floor body section 210 or the front floor 219 (e.g., a front portion of the center panel 216), and the floor sensor 22 of FIG. 5A is disposed on the centerline 0B of the vehicle 100. The floor sensor 22 may be fixed to or positioned on the lower dash panel 142*a* shown in FIG. 4, although the floor sensor 22 may of course be fixed to or positioned on the not-shown instrument panel.

The left and right rear satellite impact sensors 16 and 17 are fixed to the floor body section 210 or the rear floor 221 (e.g., rear wheel house), and the satellite safing sensor 18 is fixed to the floor body section 210 or to a boundary portion between the front floor 219 and the rear floor 221 (e.g., to an upper portion 220 of the center cross member 215 connected to a rear portion of the center tunnel 216). The left and right rear satellite impact sensors 16 and 17 shown in FIG. 5A are preferably disposed symmetrically with respect to the centerline 0B of the vehicle 100. The satellite safing sensor 18, which is disposed on the centerline OB of the vehicle 100, may be fixed to a cross member like the middle cross member 214, the center tunnel 216 or the rear floor 221. Further, the left rear satellite impact sensor 16 may be fixed, for example, to a rear portion of the left side sill 213.

Further, the left and right front satellite impact sensors 14 and 15 of FIG. 5B are fixed, for example, to the left side panel 209 or a root portion of a center pillar (B pillar) 228. The left and right front satellite impact sensors 14 and 15 shown in FIG. 5B are preferably disposed symmetrically with respect to the centerline 0B of the vehicle 100. The left front satellite impact sensor 14 may be fixed, for example, to a front portion of the left side sill 213.

Further, as shown in FIG. 5B, the primary body section of the vehicle 100 comprises the body including the front body section 200 and the floor body section 210, and panels provided on the body, such as a roof panel 203, left and right side panels 208 and 209 and a rear end panel 211. The primary body section of FIG. 5B can be called a body shell. The primary body section of FIG. 5B may include, in addition to the body shell, parts for mounting left and right front doors, left and right rear doors, a lid (trunk cover), etc.

Figure 6A:
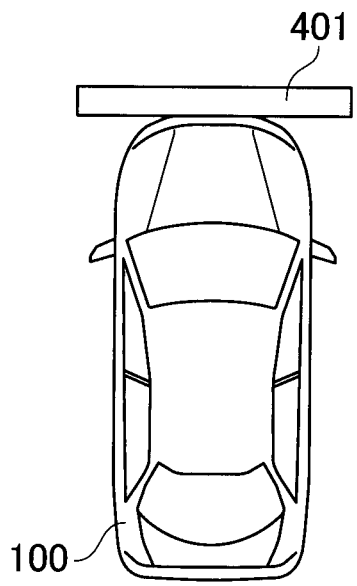
FIGS. 6A, 6B, 6C and 6D show various example front collision modes for which a likelihood of severity of front collision of the vehicle shown in FIG. 1 becoming high is high.

FIGS. 6A, 6B, 6C and 6D show example front collision modes for which a likelihood of severity of front collision becoming high is high. FIG. 6A shows full-wrap frontal collision (front-surface type front collision) where the entire front surface of the vehicle 100 collides, for example, with a concrete wall 401. A test method or conditions for full-wrap frontal collision are prescribed, for example, by the U.S.A. National Highway Traffic Safety Administration (NHTSA), according to which speed of the vehicle 100 is, for example, 35 mph≈56 km/h. Thus, the severity of front collision need be set high in a case where the vehicle 100, designed for use in the U.S.A. and traveling, for example, at 56 km/h (high speed: first speed region), collides with the concrete wall 401.

Further, a test method or conditions for full-wrap frontal collision are also prescribed, for example, the China Automotive Technology & Research Center (CATARC) or the China New Car Assessment Programme (N-CAP), according to which speed of the vehicle 100 is, for example, 50 km/h. Thus, the severity of front collision need to be set high in a case where the vehicle 100, designed for use in China and traveling, for example, at 50 km/h (high speed: first speed region), collides with the concrete wall 401.

Namely, a test method or conditions for full-wrap frontal collision can be prescribed by standards, laws, etc., and the severity of front collision is set high according to specifications required of the vehicle 100. In a case where the vehicle 100 traveling, for example, at 26 km/h (medium speed: second speed region lower than the first speed region) collides with the concrete wall 401, the severity of front collision may be set low. Further, in a case where the vehicle 100 traveling, for example, at 13 km/h (low speed: third speed region lower than the second speed region) collides with the concrete wall 401, the severity of front collision need not be set because such front collision is not severe.

Here, speeds (high speed, medium speed and low speed), such as 56 km/h, 50 km/h, 26 km/h and 13 km/h, for determining severity of front collision are used as mere examples to facilitate understanding the instant embodiment, and thus, it should be appreciated that other speeds may be used. As an example, the high speed (first speed region) is, for example, equal to or higher than 37 km/h (first reference value) or equal to or higher than 48 km/h (first reference value), the low speed (third speed region) is, for example, equal to or lower than 19 km/h (second reference value), and the medium speed (second speed region) is, for example, greater than the second reference and smaller than the first reference value.

Figure 6B:
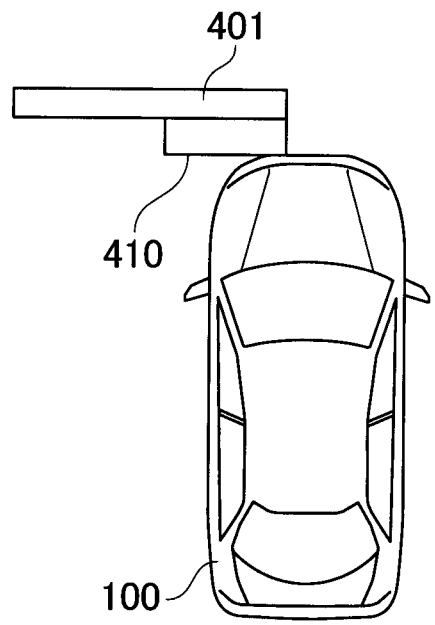

FIG. 6B shows ODB (Offset Deformable Barrier) frontal collision (front-surface type front collision) where a part of the front surface of the vehicle 100 collides, for example, with a honeycomb structure 410 provided on the concrete wall 401. A test method or conditions for the ODB frontal collision is prescribed, for example, by the U.S.A. Insurance Institute for Highway (IIHS), according to which speed of the vehicle 100 is, for example, 64 km/h. Thus, the severity of front collision need be set high in a case where the vehicle 100, designed for use in the U.S.A. and traveling, for example, at 64 km/h, collides with the honeycomb structure 410.

Figure 6C:
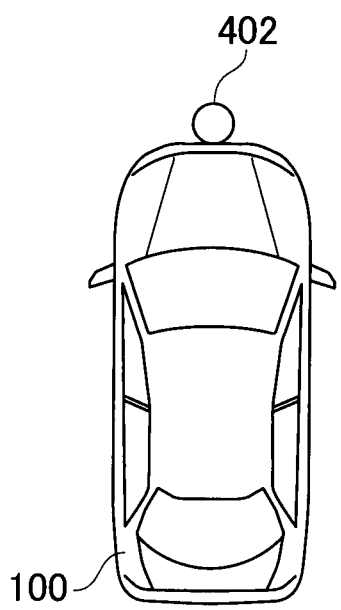
Figure 6D:
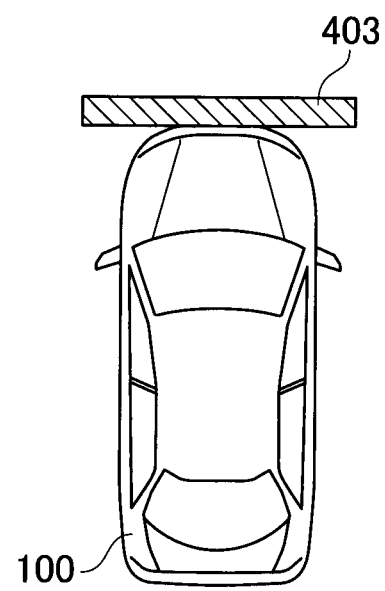

FIGS. 6C and 6D respectively show vs.-pole frontal collision (front-surface type front collision) where a part (central part) of the front surface of the vehicle 100 collides, for example, with a pole 402 and underride frontal collision where the front surface of the vehicle 100 collides with a bumper barrier 403 and dives under a bumper section of the bumper barrier 403. Although deceleration of the vehicle 100 is small immediately after occurrence of the vs.-pole frontal collision and underride frontal collision, it gradually become greater; thus, in these cases too, the severity of front collision need be set high.

FIGS. 7A, 7B and 7C show example front collision modes for which the likelihood of severity of front collision becoming high is medium. More specifically, FIG. 7A shows vs.-barrier-wall oblique frontal collision (front-surface type front collision) where a part of the front surface of the vehicle 100 collides, for example, with a barrier wall 404. Although the severity of such vs.-barrier-wall oblique frontal collision depends, for example, on a friction coefficient of the barrier wall 404, speed of the vehicle 100, etc., it is generally preferable that the severity of vs.-barrier-wall oblique frontal collision be set high, for example, in a case where the vehicle 100 is at a high speed. Further, FIG. 7B shows narrow frontal collision (front-surface type front collision) where a part of the front surface of the vehicle 100 (outer surface of the left or right front side frame 111 or 112) collides, for example, with a barrier wall 405. It is generally preferable that the severity of such narrow frontal collision too be set high, for example, in a case where the vehicle 100 is at a high speed. Further, FIG. 7C shows automobile-to-automobile offset frontal collision (front-surface type front collision) where a part of the front surface of the vehicle 100 collides with a part of the front surface of another vehicle 500. It is generally preferable that the severity of such automobile-to-automobile offset frontal collision too be set high, for example, in a case where the vehicle 100 is at a high speed, although the severity of automobile-to-automobile frontal offset collision depends on a length or range 420 of the part of the front surface of the vehicle 100.

Figure 8A:
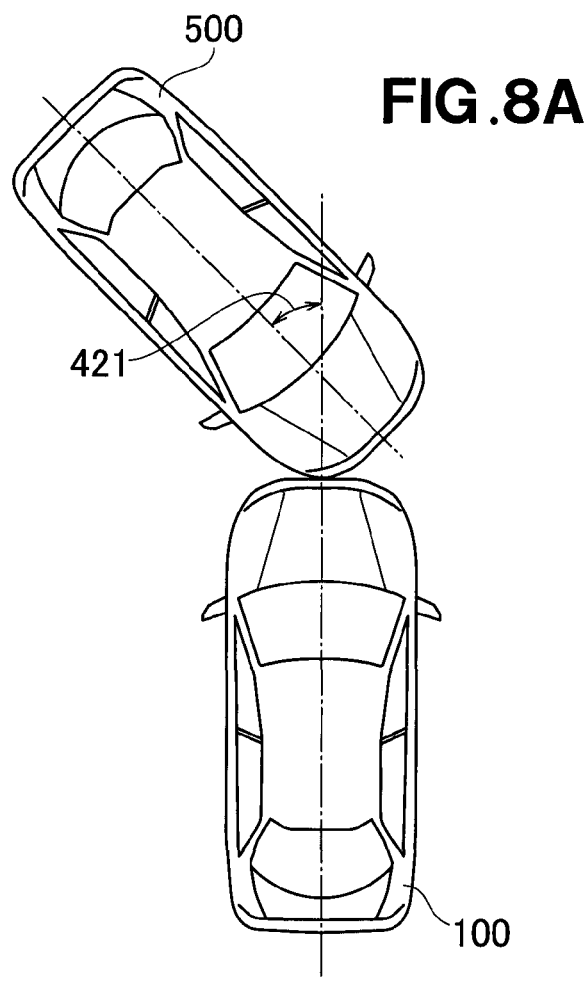
FIGS. 8A and, 8B show various example front collision modes for which the likelihood of the severity of front collision becoming high of the vehicle is low.
Figure 8B:
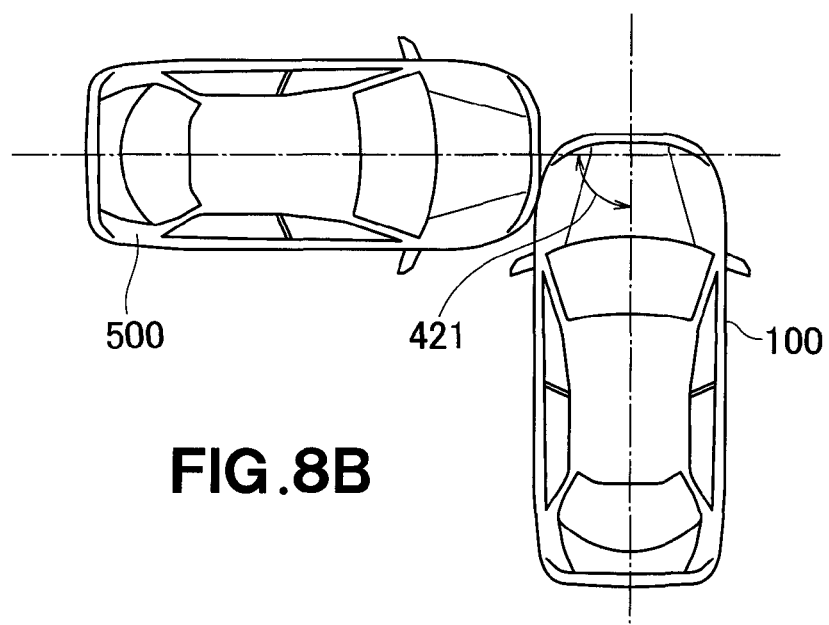

Further, FIGS. 8A and 8B show example front collision mode for which the likelihood of severity of front collision becoming high is low. More specifically, FIG. 8A shows automobile-to-automobile frontal collision (front-surface type front collision) where a part of the front surface of the vehicle 100 collides with a part of the front surface of another vehicle 500. The severity of such automobile-to-automobile frontal collision depends on an angle 421 of a traveling direction of the other vehicle 500, colliding with the vehicle 100, relative to a traveling direction of the vehicle 100, speed of the vehicle 100, etc. In a case where the angle 421 of the traveling direction (collision angle) of the other vehicle 500 is, for example, 45 degrees or over, it is generally preferable that the severity of automobile-to-automobile frontal collision be set low. FIG. 8B shows automobile-to-automobile intersecting side-surface type front collision (side-surface type front collision) where a side surface (e.g., front fender) of the front portion 110 of the vehicle 100 collides with a part of the front surface of another vehicle 500 as the two vehicles 100 and 500 enter an intersection. In a case where the angle 421 of the traveling direction (collision angle) of the other vehicle 500 is, for example, 90 degrees, it is generally preferable that the severity of automobile-to-automobile intersecting side-surface type front collision too be set low. In the case where the angle 421 of the traveling direction of the other vehicle 500 is, for example, in the range of 45 degrees to 90 degrees as shown in FIGS. 8A and 8B, it is generally preferable that the severity of automobile-to-automobile front collision having a great collision angle be set low. Note that, in the case where the angle 421 of the traveling direction of the other vehicle 500 is, for example, 45 degrees or below, the severity of automobile-to-automobile front collision having a small collision angle, including automobile-to-automobile front collision having a zero collision angle as shown in FIG. 7C, be set high.

Further, FIG. 9 shows an example of a two-dimensional map for determining severity and mode of front collision. As noted above, the determination section 24 of FIG. 2 can determine severity of front collision by use of an integrated value of the first acceleration, for example, only in the backward direction DB (i.e., deceleration a30) of the vehicle 100 detected by the front sensor (first sensor) 30 and an integrated value of the second acceleration, for example, in the rightward direction DF and leftward direction DL of the vehicle 100 detected by the front sensor 30. Namely, the determination section 24 can determine severity of front collision by checking whether or not coordinates determined by the above-mentioned two integrated values exceed any one of two-dimensional threshold values within the two-dimensional map of FIG. 9. Note that the two-dimensional map or two-dimensional threshold values are prestored, for example, in a storage section 26 shown in FIG. 2. Further, the storage section 26 can also store data indicative of results of determinations made by the determination section 24, results of arithmetic operations, etc.

When front collision of the vehicle 100 is not severe, the vehicle collision determination apparatus and the determination section 24 need not deploy any one of the airbag associated with the driver's seat and the airbag associated with the assistant driver's seat. Stated differently, when front collision of the vehicle 100 is severe, the determination section 24 deploys the airbag associated with the driver's seat and the airbag associated with the assistant driver's seat, at which time the determination section 24 can properly set hardness or inner pressure (protecting force) of the airbag associated with the driver's seat and the airbag associated with the assistant driver's seat. Of course, when front collision of the vehicle 100 is severe, the determination section 24 can control a seat belt pretensioner 41, a load determination mechanism 45, etc. as well as the airbag associated with the driver's seat and the airbag associated with the assistant driver's seat, and the determination section 24 can more properly set, in accordance with severity of front collision, restraining force (protecting force) with which the webbing 46 restrains the vehicle occupant. The severity of front collision may be represented by any one of a plurality of levels; for example, in a case where the severity of front collision is represented by any one of two levels, the determination section 24 can determine whether the severity of front collision is high or not, and/or, whether the severity of front collision is low or not.

The two-dimensional map shown in FIG. 9 may be a map including a plurality of regions and intended, for example, for determining only first regions 485. More specifically, each of the first regions 485 is a region indicating that the severity of front collision is low. Each of second regions 486 adjacent to the first regions 485 is a region indicating that there is no severity of front collision. Each of boundaries between the first regions 485 and the second regions 486 is set as a two-dimensional threshold value (i.e., first two-dimensional threshold value). When the coordinates determined by the integrated value of the first acceleration (deceleration a30) detected by the front sensor 30 and the integrated value of the second acceleration detected by the front sensor 30 exceed the two-dimensional threshold value (first two-dimensional threshold value), the determination section 24 can determine that the severity of front collision (first region 485) of the vehicle 100 is low.

The vertical axis dv30 (DB) of the two-dimensional map of FIG. 9 represents the integrated value of the first acceleration (i.e., deceleration a30) only in the backward direction DB of the vehicle 100 detected by the front sensor (first sensor) 30. More specifically, the determination section 24 performs first-order sectional integration on the output of the front sensor 30 (first acceleration) to thereby calculate or generate a backward first-order sectional integrated value. Note that the determination section 24 may perform backward second-order sectional integration, instead of the backward first-order sectional integration, on the output of the front sensor 30 (first acceleration) to thereby calculate or generate a backward second-order sectional integrated value. However, the necessary amount of calculation for the backward second-order sectional integrated value would become greater than the necessary amount for calculation of the backward first-order sectional integrated value. Further, a backward first-order total integrated value or a backward second-order total integrated value may be used in place of the backward first-order sectional integrated value or a backward second-order sectional integrated value, in which case, however, it is difficult to set, or distinguish among, individual regions within the two-dimensional map.

Further, the horizontal axis dv30 (DL) of the two-dimensional map of FIG. 9 represents the integrated value of the second acceleration in the leftward direction DL of the vehicle 100 detected by the front sensor 30. More specifically, the determination section 24 performs first-order sectional integration on the output of the front sensor 30 (second acceleration) to thereby calculate or generate a leftward first-order sectional integrated value. Note that the determination section 24 may perform second-order sectional integration, instead of the first-order sectional integration, on the output of the front sensor 30 (second acceleration) to thereby calculate or generate a leftward second-order sectional integrated value. When the second acceleration is positive, for example, the output of the front sensor 30 indicates second acceleration in the leftward direction DL of the vehicle 100, and the leftward first-order sectional integrated value (or leftward second-order sectional integrated value) indicates a positive value. When the second acceleration is negative, on the other hand, the output of the front sensor 30 indicates second acceleration in the rightward direction DR of the vehicle 100, and the rightward first-order sectional integrated value (or rightward second-order sectional integrated value) indicates a negative value. Further, a leftward first-order total integrated value or leftward second-order total integrated value may be used in place of the leftward first-order sectional integrated value or leftward second-order sectional integrated value.

Namely, when the output of the front sensor 30 has (is indicative of) not only the first acceleration at least in the backward direction DB of the vehicle 100 but also the second acceleration in the rightward direction DR and in the leftward direction DL of the vehicle 100, front collision including not only "frontal collision (front-surface type front collision)" but also "side-surface type front collision" is reflected on the two-dimensional map shown in FIG. 9. Thus, the first region 485 within the two-dimensional map indicates side-surface type front collision (e.g., automobile-to-automobile intersecting side-surface type front collision where the other vehicle 500 collides, for example, with the right front fender 145 of the vehicle 100). In other words, the determination section 24 can not only determine that the severity of the front collision of the vehicle 100 (first region 485) is low but also determine a mode of the front collision (e.g., side-surface type front collision including automobile-to-automobile intersecting side-surface type front collision shown in FIG. 8B.

As also shown in FIG. 9, the two-dimensional map may further include third regions 480 adjacent to the second regions 486 and fourth regions 481 adjacent to the third regions 480 so as to distinguish between the third regions 480 and the fourth regions 481. More specifically, each of the third regions 480 is a region indicating that the severity of front collision is high. Each of boundaries between the third regions 480 and the fourth regions 481 is set as a two-dimensional threshold value (i.e., second two-dimensional threshold value). When the coordinates determined by the integrated value of the first acceleration (deceleration a30) detected by the front sensor 30 and the integrated value of the second acceleration detected by the front sensor 30 exceed the two-dimensional threshold value (second two-dimensional threshold value), the determination section 24 determines that the severity of front collision (fourth region 481) of the vehicle 100 is high.

In addition, by determining which one of the regions within the two-dimensional map the coordinates determined by the integrated value of the first acceleration (deceleration a30) detected by the front sensor 30 and the integrated value of the second acceleration detected by the front sensor 30 belongs to, the determination section 24 can determine a mode of front collision (front collision mode) corresponding to that region. For example, when the coordinates belong to the third region 480 or fourth region 481, the determination section 24 can determine the mode of the front collision to be first front-surface type front collision. The term "first front-surface type front collision" as used herein embraces the full-wrap frontal collision of FIG. 6A, the vs.-pole frontal collision of FIG. 6C, etc.

As also shown in FIG. 9, the two-dimensional further includes fifth regions 482 adjacent to the second regions 486 and sixth regions 483 adjacent to the fifth regions 482 so as to distinguish between the fifth regions 482 and the sixth regions 483. More specifically, each of the fifth regions 482 is a region indicating that the severity of front collision is low, and each of the sixth regions 483 is a region indicating that the severity of front collision is high. Each of boundaries between the fifth regions 482 and the sixth regions 483 is set as a two-dimensional threshold value (i.e., third two-dimensional threshold value). When the coordinates determined by the integrated value of the first acceleration (deceleration a30) detected by the front sensor 30 and the integrated value of the second acceleration detected by the front sensor 30 exceed the two-dimensional threshold value (third two-dimensional threshold value), the determination section 24 determines that the severity of front collision (sixth region 483) of the vehicle 100 is high. Further, when the coordinates belong to the fifth region 482 or sixth region 483 within the two-dimensional map, for example, the determination section 24 can determine the mode of the front collision to be "second front-surface type front collision". The term "second front-surface type front collision" as used herein embraces the ODB frontal collision of FIG. 6B etc.

The two-dimensional map of FIG. 9 further includes seventh regions 484 adjacent to the second regions 486 so as to determine the seventh regions 484. More specifically, each of the seventh regions 484 is a region indicating that the severity of front collision is likely to be high. In other words, each of the seventh regions 484 is where a region the severity of front collision is high and a region where the severity of front collision is low exist in a mixture. It is difficult to set in the seventh region 484 a boundary (fourth two-dimensional threshold value) like, for example, the boundary between the third region 480 and the fourth region 481 (second two-dimensional threshold value).

Thus, each of boundaries between the second regions 486 and the seventh regions 484 may be set as a two-dimensional threshold value (fifth two-dimensional threshold value). When the coordinates determined by the integrated value of the first acceleration (deceleration a30) detected by the front sensor 30 and the integrated value of the second acceleration detected by the front sensor 30 exceed the two-dimensional threshold value (fifth two-dimensional threshold value), the determination section 24 determines that the severity of front collision (seventh region 484) of the vehicle 100 is always high. Further, when the coordinates belong to the seventh region 484 within the two-dimensional map, for example, the determination section 24 can determine the front collision mode to be "third front-surface type front collision" or a "predetermined mode". The term "third front-surface type front collision" or "predetermined mode" as used herein embraces the vs.-barrier-wall oblique frontal collision of FIG. 7A, the automobile-to-automobile offset frontal collision of FIG. 7C, the automobile-to-automobile oblique frontal collision of FIG. 8A, etc.

Figure 10:
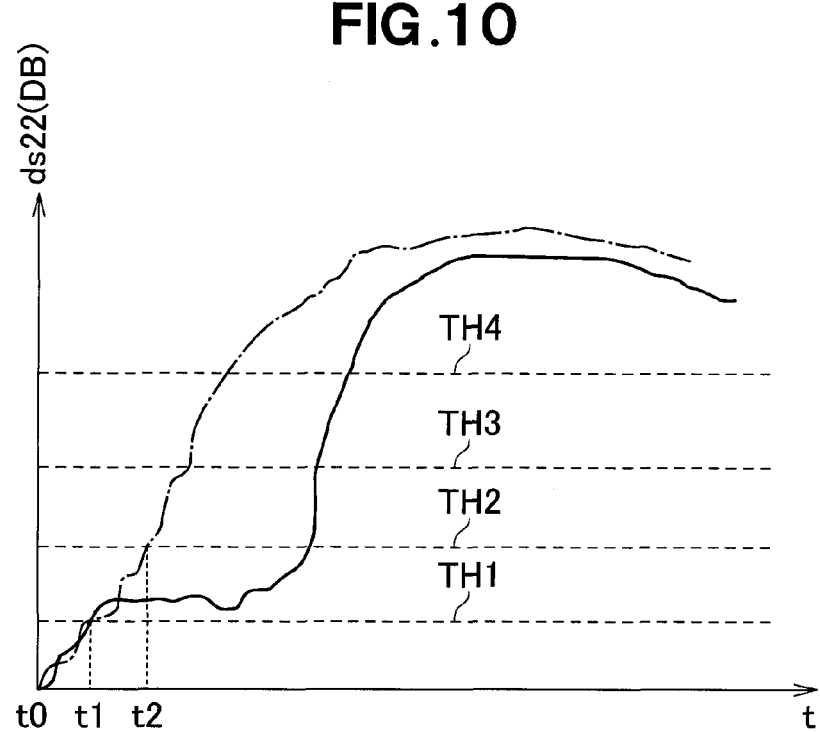
FIG. 10 shows examples of one-dimensional threshold values for determining initial deployment timing at which an airbag associated with a driver's seat and/or an airbag associated with an assistant driver's seat should be deployed first.

FIG. 10 shows examples of one-dimensional threshold values for determining initial or first deployment timing at which the airbag associated with the driver's seat and/or the airbag associated with the assistant driver's seat should be deployed first. Because the determination section 24 can determine a mode of front collision (front collision mode) by use of the two-dimensional map of FIG. 9, it can determine initial or first deployment timing corresponding to the determined mode of front collision in accordance with any one of the one-dimensional threshold values shown in FIG. 10. Thus, the vehicle collision determination apparatus or the determination section 24 can more properly set start timing of protecting force of the airbag associated with the driver's seat and/or the airbag associated with the assistant driver's seat. Note that the one-dimensional threshold values are prestored, for example, in the storage section 26 of FIG. 2.

In the case where FIG. 9 shows four front collision modes: first front-surface type front collision (third region 480 and fourth region 481); second front-surface type front collision (fifth region 482 and sixth region 483); third front-surface type front collision (seventh region 484); and side-surface type front collision (first region 485), FIG. 10 preferably shows, for example, four one-dimensional threshold values TH1, TH2, TH3 and TH4. Note, however, that FIG. 10 may show, for example, three one-dimensional threshold values in the case where FIG. 9 shows the four front collision modes. In other words, the number of the one-dimensional threshold values shown in FIG. 10 may be smaller than the number of the front collision modes shown in FIG. 9; namely, one of the one-dimensional threshold values may be shared between or among two or more front collision modes.

The vertical axis ds22(DB) of FIG. 10 represents an integrated value of third acceleration (deceleration a22) in the backward direction DB of the vehicle 100 detected by the floor sensor 22. Note here that the vehicle collision determination unit 20 of FIG. 2 uses not only the output of the front sensor 30 but also the output of the floor sensor 22. In other words, the embodiment of the vehicle collision determination apparatus may further include the floor sensor 22 provided in the passenger compartment of the vehicle 100. The output of the floor sensor 22 of FIG. 2 has (is indicative of) both the third acceleration in the forward direction DF and backward directions DB of the vehicle 100 and fourth acceleration in the right direction DR and leftward directions DL of the vehicle 100. Note, however, that the third acceleration in the forward direction DF and backward direction DB of the vehicle 100 may be replaced with the third acceleration only in the backward direction DB of the vehicle 100 (i.e., deceleration a22) and that the fourth acceleration in the rightward direction DR and leftward direction DL of the vehicle 100 may be replaced with the fourth acceleration only in the rightward directions DR of the vehicle 100 or only in the leftward directions DL of the vehicle 100. Further, although the output of the floor sensor 22 of FIG. 2 is provided as biaxial output, it need not necessarily be biaxial output and may be indicative of the third acceleration only in the backward direction DB (i.e., deceleration a22).

In order to use the one-dimensional threshold values shown in FIG. 10, the determination section 24 may perform second-order sectional integration on the output of the floor sensor 22 (third acceleration) to thereby calculate or generate a backward second-order sectional integrated value. Alternatively, the determination section 24 may perform first-order sectional integration on the output of the floor sensor 22 (third acceleration) to thereby calculate or generate a backward first-order sectional integrated value instead of the backward second-order sectional integrated value (ds22(DB)). Although the necessary amount of calculation for the backward second-order sectional integrated value would become greater than the necessary amount of calculation for the backward first-order sectional integrated value, such a greater amount of calculation for the backward second-order sectional integrated value can more properly set start timing of protecting force of the airbag associated with the driver's seat and/or the airbag associated with the assistant driver's seat. Further, a backward second-order total integrated value or a backward first-order total integrated value may be used in place of the backward second-order sectional integrated value or the backward first-order total integrated value.

The horizontal axis t of FIG. 10 represents the time or current time. Because such a horizontal axis t of FIG. 10 is set, there is no need to generate an integrated value etc. Further, because the horizontal axis t of FIG. 10 represents the time or current time, it is easy to set, or distinguish among, the individual one-dimensional threshold values TH1, TH2, TH3 and TH4.

A solid line in FIG. 10 corresponds to the first front-surface type front collision and more particularly to the vs.-pole frontal collision of FIG. 6C or the fourth region 481 of FIG. 4. Thus, the determination section 24 sets the first one-dimensional threshold value TH1 corresponding to the first front-surface type front collision and determines, using the backward second-order sectional integrated value of the third acceleration (ds22(DB)), whether the current time is initial or first deployment timing. The backward second-order sectional integrated value of the third acceleration (solid line in FIG. 10) exceeds the first one-dimensional threshold value TH1, for example, at time t1. At time t1, the determination section 24 of FIG. 2 not only activates a first inflator 21-1 of the airbag module 21 associated with the driver's seat but also activates a first inflator 23-1 of the airbag module 23 associated with the assistant driver's seat. The first one-dimensional threshold value TH1 is set lower than the second to fourth one-dimensional threshold values TH2, TH3 and TH4; that is, the first one-dimensional threshold value TH1 is set at the lowest of the four one-dimensional threshold values. Thus, when the front collision mode is the first front-surface type front collision, the airbags associated with the driver's seat and the assistant driver's seat can be deployed earliest of all airbags in the vehicle. Similarly, the determination section 24 can determine, in accordance with the front collision mode, timing for starting activation of the pretensioner 41, and when the front collision mode is the first front-surface type front collision, the determination section 24 can activate the pretensioner 41 earliest of all.

A one-dot chain line in FIG. 10 corresponds to the second front-surface type front collision and more particularly to the ODB frontal collision of FIG. 6B or the sixth region 483 of FIG. 9. Thus, the determination section 24 sets the second one-dimensional threshold value TH2 corresponding to the second front-surface type front collision. The backward second-order sectional integrated value of the third acceleration (one-dot chain line in FIG. 10) exceeds the second one-dimensional threshold value TH2, for example, at time t2. At time t2, the determination section 24 not only activates the first inflator 21-1 of the airbag module 21 associated with the driver's seat but also activates the first inflator 23-1 of the airbag module 23 associated with the assistant driver's seat. The second one-dimensional threshold value TH2 is set higher than the first one-dimensional threshold value TH1 but lower than the third and fourth one-dimensional threshold values TH3 and TH4; that is, the second one-dimensional threshold value TH3 is set at the second-lowest value of the four one-dimensional threshold values. Because there is a difference between time t1 and time t2 as shown in FIG. 10, the determination section 24 can more properly determine first deployment timing in accordance with the first front-surface type front collision or second front-surface type front collision. Similarly, when the front collision mode is the second front-surface type front collision, the determination section 24 can more properly determine timing for starting activation of the pretensioner 41.

When the front collision mode is one of the third and fourth front-surface type front collision, the determination section 24 need not control the airbags associated with the driver's seat and the assistant driver's seat, the pretensioner 41, etc. at early timing. The fourth one-dimensional threshold value TH4 in FIG. 10 is higher than the first to third one-dimensional threshold values TH1, TH2 and TH3 and corresponds to the side-surface type front collision and more particularly to the first region 485 of FIG. 9. Further, the third one-dimensional threshold value TH3 is higher than the first and second one-dimensional threshold values TH1 and TH2 and corresponds to the third front-surface type front collision and more particularly to the seventh region 484 of FIG. 9. The seventh regions 484 is where a region where the severity of front collision is high and a region where the severity of front collision is low exist in a mixture. It is preferable to set in the seventh region 484 a boundary (fourth two-dimensional threshold value) like, for example, the boundary between the third region 480 and the fourth region 481 (second two-dimensional threshold value), for a reason to be set forth hereinbelow.

Figure 11:
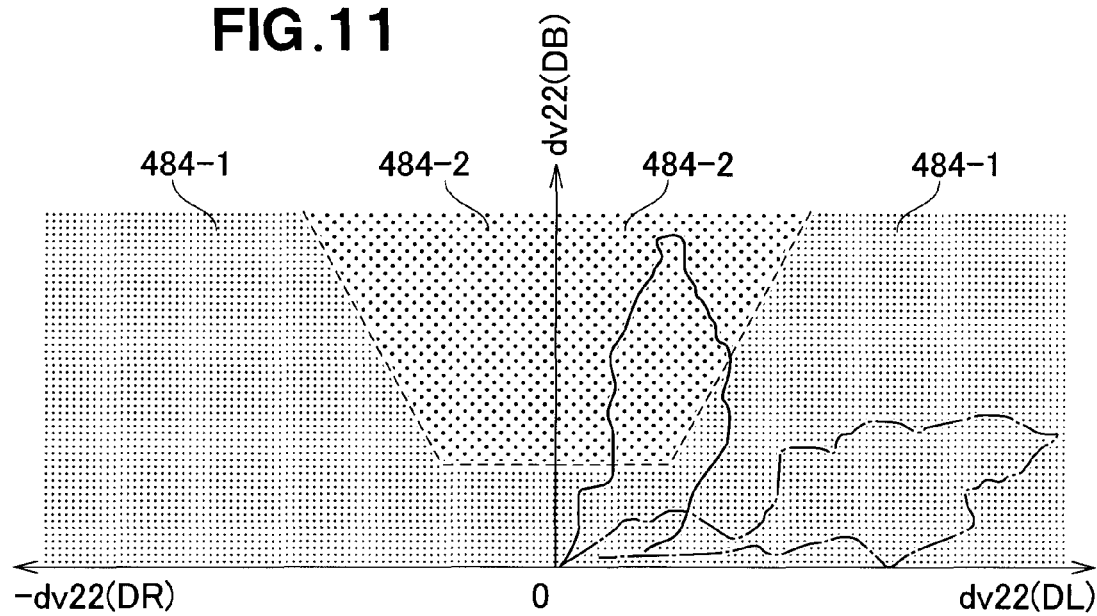
FIG. 11 shows an example of a two-dimensional map for determining severity of front collision having a predetermined mode shown in FIG. 9.

FIG. 11 shows an example of the two-dimensional map for determining severity of front collision (third front-surface type front collision) having the predetermined mode (seventh region 484) shown in FIG. 9. The two-dimensional map (second two-dimensional map) of FIG. 11 includes, for example, two regions 484-1 and 484-2 that correspond to the seventh regions 484 within the two-dimensional map (first two-dimensional map) of FIG. 9. Because the second two-dimensional map of FIG. 11 is created, it is possible to set, in the two-dimensional map of FIG. 11 or the seventh region 484 of FIG. 9, a boundary (fourth two-dimensional threshold value) between the region 484-1 (where the severity of front collision is low) and the region 484-2 (where the severity of front collision is high). Note that the two-dimensional map of FIG. 11 is prestored, for example, in the storage section 26 of FIG. 2.

The vertical axis dv22(DB) of FIG. 11 represents the integrated value of the third acceleration (deceleration a22) in the backward direction of the vehicle 100 detected by the floor sensor 22. More specifically, the determination section 24 calculates or generates a backward first-order sectional integrated value by performing first-order sectional integration on the output of the floor sensor 22 (second acceleration). Alternatively, the determination section 24 may perform second-order sectional integration on the output of the floor sensor 22 (third acceleration) to thereby calculate or generate a backward second-order sectional integrated value in place of the backward first-order sectional integrated value (dv22(DL)), although the necessary amount of calculation for the backward second-order sectional integrated value would become greater than the necessary amount of calculation for the backward first-order sectional integrated value.

The vertical axis dv22(DL) of FIG. 11 represents the integrated value of the second acceleration in the leftward direction DL of the vehicle 100 detected by the front sensor 30. More specifically, the determination section 24 calculates or generates a leftward first-order sectional integrated value by performing first-order sectional integration on the output of the floor sensor 22 (fourth acceleration). Alternatively, the determination section 24 may perform second-order sectional integration on the output of the floor sensor 22 (fourth acceleration) to thereby calculate or generate a leftward second-order sectional integrated value in place of the leftward first-order sectional integrated value (dv22(DL)). When the fourth acceleration is positive, for example, the output of the floor sensor 22 indicates the fourth acceleration in the leftward direction DL of the vehicle 100, and the leftward first-order sectional integrated value (or leftward second-order sectional integrated value) indicates a positive value. When the fourth acceleration is negative, on the other hand, the output of the floor sensor 22 indicates the second acceleration in the rightward direction DR of the vehicle 100, and the rightward first-order sectional integrated value (or rightward second-order sectional integrated value) indicates a negative value.

When the determination section 24 has determined, using for example the two-dimensional map of FIG. 9, that the front collision mode is the predetermined mode or the seventh region 484, the determination section 24 can determine severity of the front collision using, for example, the integrated value of the third acceleration and integrated value of the fourth acceleration within the second two-dimensional map of FIG. 11. The term "predetermined mode" or "third front-surface type front collision" (seventh region 484 of FIG. 9) as used herein embraces the vs.-barrier-wall oblique frontal collision of FIG. 7A, the automobile-to-automobile offset frontal collision of FIG. 7C and the automobile-to-automobile oblique frontal collision of FIG. 8A.

Depending on the front collision mode, it may sometimes be difficult for the determination section 24 to accurately determine severity of the front collision using the integrated value of the first acceleration and the integrated value of the second acceleration. For example, the severity of the vs.-barrier-wall oblique frontal collision of FIG. 7A depends, for example, on a friction coefficient of the barrier wall, speed of the vehicle 100, etc. Further, the severity of the automobile-to-automobile offset frontal collision of FIG. 7C depends on the length or range 420 of the part of the front surface of the vehicle 100 colliding with the other vehicle 500, speed of the vehicle 100, etc. Further, the severity of the automobile-to-automobile oblique frontal collision of FIG. 8A depends on the angle 421 of the traveling direction of the other vehicle 500, colliding with the vehicle 100, relative to the traveling direction of the vehicle 100, speed of the vehicle 100, etc.

When the front collision mode of the vehicle 100 is the predetermined mode, the determination section 24 can use the bi-axial output (i.e., integrated value of the third acceleration and integrated value of the fourth acceleration) of the floor sensor (second sensor) 22. Because such a floor sensor 22 is provided in the passenger compartment of the vehicle 100, the determination section 22 can readily determine severity of the front collision using the integrated value of the third acceleration and integrated value of the fourth acceleration, for example, by determining whether or not coordinates determined by these two integrated values exceed the two-dimensional threshold value (i.e., fourth two-dimensional threshold value represented by the boundary between the region 484-1 and the region 484-2) within the two-dimensional map of FIG. 11. In other words, although the determination section 24 may always determine the severity of the predetermined mode to be high (region 484 of FIG. 9) when the front collision mode of the vehicle 100 is the predetermined mode, it is preferable that the determination section 24 determine severity of the predetermined mode (region 484-1 or the region 484-2 of FIG. 11) using the output of the floor sensor 22.

A solid line in FIG. 11 corresponds, for example, to the vs.-barrier-wall oblique frontal collision of FIG. 7A that is one example of the third front-surface type front collision belonging to the region 484 of FIG. 9, and the determination section 24 can determine that the severity of the front collision belonging to the region 484-2 of FIG. 11 is high. Further, a one-dot chain line in FIG. 11 corresponds, for example, to the automobile-to-automobile oblique frontal collision of FIG. 8A that is another example of the third front-surface type front collision belonging to the region 484 of FIG. 9, and the determination section 24 can determine that the severity of the front collision belonging to the region 484-1 of FIG. 11 is low. In this manner, the determination section 24 can distinguish between the automobile-to-automobile oblique frontal collision (region 484-1) and the ODB frontal collision (regions 482 and 483) that are examples of the front-surface type front collision, using the two-dimensional maps of FIGS. 9 and 11.

Figure 12:
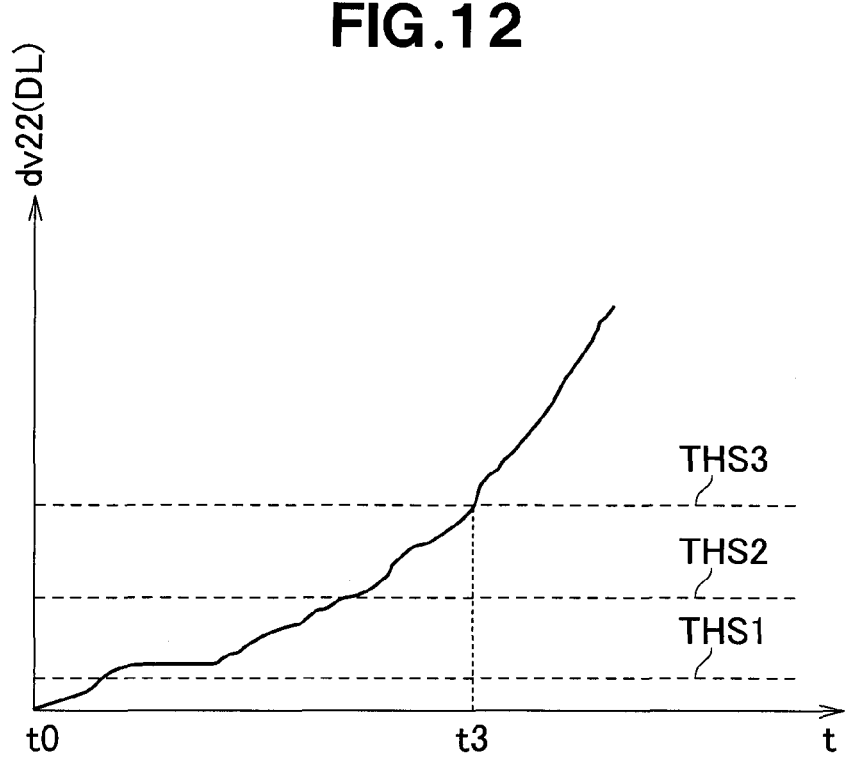
FIG. 12 shows examples of one-dimensional threshold values for determining timing for deploying a side airbag.

FIG. 12 shows examples of the one-dimensional threshold value for determining timing for deploying any of the side airbags. Because the determination section 24 can determine a front collision mode by use of the two-dimensional map of FIG. 9, it can determine deployment timing corresponding to the determined front collision mode by use of the one-dimensional threshold value shown in FIG. 12. Thus, the vehicle collision determination apparatus or the determination section 24 can more properly set start timing of protecting force of the side airbag.

Note that the one-dimensional threshold values shown in FIG. 12 are prestored, for example, in the storage section 26 of FIG. 2. Further, the determination section 24 can use a mode of front collision, determined on the basis of the output of the front sensor 30 independently of the output of the satellite impact sensors 14, 15, 16 and 17, for control of a left side airbag module 25 and a right side airbag module 27 of FIG. 2. The left side airbag module 25, for example, can deploy the left side airbag.

In the case where FIG. 9 shows four front collision modes: first front-surface type front collision (third region 480 and fourth region 481); second front-surface type front collision (fifth region 482 and sixth region 483); third front-surface type front collision (seventh region 484); and side-surface type front collision (first region 485), FIG. 12 preferably shows, for example, three one-dimensional threshold values THS1, THS2 and THS3. It is preferable to deploy any of the side airbags in some front collision mode, and thus, when front collision other than the first front-surface-side front collision (third region 480 and fourth region 481) has occurred, the vehicle collision determination apparatus or the determination section 24 can more properly protect a vehicle occupant with the side airbag. Of course, when only the side airbag is to be deployed, the two-dimensional map of FIG. 9 may include at least three front collision modes (second front-surface type front collision, third front-surface type front collision and side-surface type front collision), and the determination section 24 need not determine severity of front collision (third and fourth regions 480 and 481 of FIG. 9, and regions 484-1 and 484-2 of FIG. 11).

The vertical axis dv22(DB) of FIG. 12 represents the integrated value of the fourth acceleration in the leftward direction DL of the vehicle 10 detected by the floor sensor 22. In order to use the one-dimensional threshold values shown in FIG. 12, the determination section 24 may perform first-order sectional integration on the output of the floor sensor 22 (fourth acceleration) to thereby calculate or generate a leftward first-order sectional integrated value. Alternatively, the determination section 24 may perform second-order sectional integration on the output of the floor sensor 22 (fourth acceleration) to thereby calculate or generate a leftward second-order sectional integrated value in place of the leftward first-order sectional integrated value (dv22(DL)). However, the necessary amount of calculation for the leftward second-order sectional integrated value would become greater than the necessary amount of calculation for the leftward first-order sectional integrated value. Further, a leftward first-order total integrated value or a leftward second-order total integrated value may be used in place of the leftward first-order sectional integrated value or the leftward second-order total integrated value.

The horizontal axis t of FIG. 12 represents the time or current time. In other words, there is no need to generate an integrated value etc. in order to set such a horizontal axis t of FIG. 12. Further, because the horizontal axis t of FIG. 10 represents the time or current time, it is easy to set, or distinguish among, the individual one-dimensional threshold values THS1, THS2 and THS3.

A solid line in FIG. 12 corresponds to the second front-surface type front collision and more particularly to the ODB frontal collision of FIG. 6B or the sixth region 483 of FIG. 9. Thus, the determination section 24 sets the third one-dimensional threshold value THS3 corresponding to the second front-surface type front collision and determines, using the leftward first-order sectional integrated value of the fourth acceleration (dv22(DL)), whether the current time is timing for deploying the side airbag. The leftward first-order sectional integrated value of the fourth acceleration (solid line in FIG. 12) exceeds the third one-dimensional threshold value THS3, for example, at time t3. At time t3, the determination section 24 of FIG. 2 can activate a not-shown inflator of the right side airbag module 27 so that the right side airbag can be deployed. The third one-dimensional threshold value THS3 is set higher than the first and second one-dimensional threshold values THS1 and THS2.

The one-dimensional threshold value THS1 of FIG. 12 is set lower than the second and third one-dimensional threshold values THS2 and THS3, and it corresponds to a side-surface type front collision and more particularly to the first region 485 of FIG. 9. Thus, when the front collision is a side-surface type front collision, the determination section 24 can deploy, for example, the right side airbag earliest of all the airbags in the vehicle 100. Further, the second one-dimensional threshold value THS2 is lower than the first one-dimensional threshold value THS1, and it corresponds to the third front-surface type front collision and more particularly to the seventh region 484 of FIG. 7.

FIG. 12 shows, for example, three one-dimensional threshold values THS1, THS2 and THS3, and these one-dimensional threshold values THS1, THS2 and THS3 may be positioned symmetrically with respect to the horizontal axis t of FIG. 12. In other words, the vertical axis of FIG. 12 represents the leftward one-order sectional integrated value; when the fourth acceleration is, for example, negative, the determination section 24 can control a not-shown inflator of the left side airbag module 25 by calculating a rightward one-order sectional integrated value, so that the left side airbag can be inflated.

Note that the vehicle collision determination unit 20 can deploy any of the side airbags on the basis of the output of the satellite impact sensors (third sensors) 14, 15, 16 and 17 independently of the output of the front sensor 30 (third sensor) (see FIG. 9). The output of the satellite impact sensors 14, 15, 16 and 17 of FIG. 2 has acceleration in the rightward direction DR and leftward direction DL of the vehicle 100 (i.e., fifth acceleration). Note, however, that the output of the right satellite impact sensors 15 and 17 may have acceleration only in the leftward direction DL of the vehicle 100 (fifth acceleration). Alternatively, the output of the left satellite impact sensors 14 and 16 may have acceleration only in the rightward direction DL (fifth acceleration).

For example, when there has occurred "side collision" (not shown) where the right front door and the right rear door, constituting a side surface of the vehicle 100, collide with the barrier wall or other vehicle 50, the output of the right satellite impact sensors 15 and 17 has acceleration in the leftward direction exceeding a threshold value (not shown). At that time, the determination section 24 can deploy the right side airbag by controlling the right side airbag module 27. Preferably, when the output of the right satellite impact sensors 15 and 17 has acceleration in the leftward direction DL exceeding a threshold value and the output of the satellite safing sensor (fourth sensor) 18 has acceleration in the leftward direction DL exceeding a threshold value (not shown), for example, the determination section 24 controls the right side airbag module 27.

Namely, upon occurrence of side collision of the vehicle 100, the determination section 24 can deploy any of the side airbag on the basis of the output of the satellite impact sensors 14, 15, 16 and 17. Also, upon occurrence of front collision (FIG. 9) of the vehicle 100, the determination section 24 can deploy any of the side airbags on the basis of the output of the front sensor (first sensor) 30.

However, even when front collision of the vehicle 100 has occurred with no side collision, the output of the satellite impact sensors 14, 15, 15 and 17 may sometimes have (indicate) acceleration in the leftward direction DL and/or rightward direction (i.e., fifth acceleration) exceeding a threshold value. Depending on the mode of the front collision, it is not preferable to deploy any of the side airbags on the basis of the output of the satellite impact sensors 14, 15, 16 and 17, in which case the determination section 24 can avoid any of the side airbags from being deployed erroneously. However, in view of multiple collision, it is preferable to deploy any of the side airbags on the basis of the output of the satellite impact sensors 14, 15, 16 and 17 when side collision of the vehicle 100 has occurred immediately following occurrence of front collision of the vehicle 100; in this way, start timing of protecting force of the side airbag can be set more properly.

More specifically, the determination section 24 preferably determines, in accordance with a mode of front collision, whether deployment of the aide airbags should be inhibited or not. Namely, when the first front-surface type front collision (third region 480 and fourth regions 481) of FIG. 9 has occurred, the vehicle collision determination apparatus or the determination section 24 inhibits the side airbags from being deployed on the basis of the output of the satellite impact sensors 14, 15, 16 and 17. Of course, when the coordinates (dv30(DL), dv30(DB)) returns again to the second region 486 following the occurrence of the first front-surface type front collision, the determination section 24 does not inhibit the side airbags from being deployed on the basis of the output of the satellite impact sensors 14, 15, 16 and 17. Further, when there has occurred any other front collision than the first front-surface type front collision of FIG. 9, such as the second front-surface type front collision, the third front-surface type front collision or the side-surface type front collision, the determination section 24 does not inhibit the side airbags from being deployed on the basis of the output of the satellite impact sensors 14, 15, 16 and 17.

Figure 13:
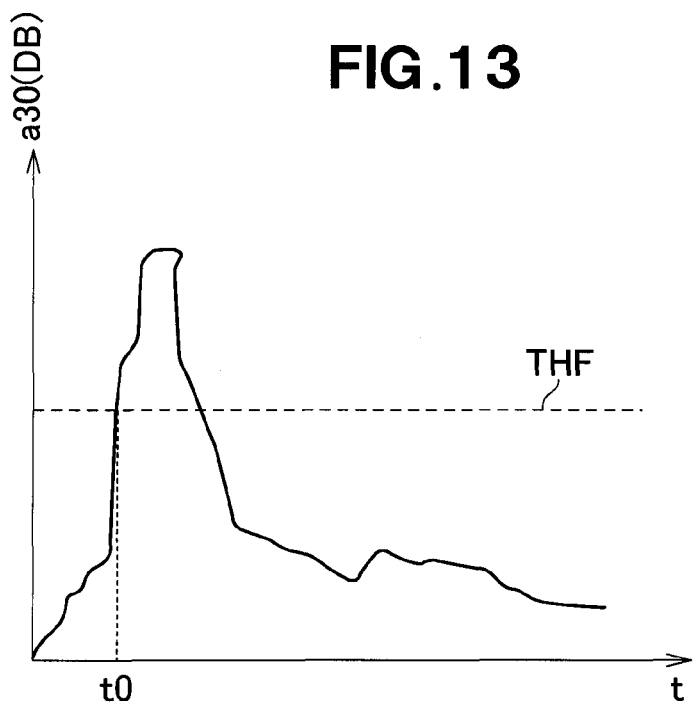
FIG. 13 shows an example of a one-dimensional threshold value for determining occurrence of collision.

Further, FIG. 13 shows an example of a one-dimensional threshold value for determining occurrence of collision of the vehicle 100. The vertical axis a30(DB) of FIG. 13 represents the first acceleration (deceleration a30) in the backward direction DB of the vehicle 100 detected by the front sensor 30, while the horizontal axis t represents the time or current time. When front collision has occurred, for example, the output of the front sensor 30 has acceleration in the backward direction DB (first acceleration) exceeding a one-dimensional threshold value THF. In FIG. 13, the output of the front sensor 30 exceeds the one-dimensional threshold value THF, for example, at time to. After time t0, the determination section 24 may start plotting coordinates (dv30(DL), dv30(DB)), for example, onto the two-dimensional map of FIG. 9 and may start determining severity and/or mode of the front collision by determining which one of the regions within the two-dimensional map of FIG. 9 the coordinates (dv30(DL), dv30(DB)) at the current time belongs to. Similarly, after time t0, for example, the determination section 24 may start determining whether or not the acceleration value (ds22(DB)) exceeds, for example, any one of the one-dimensional threshold value of FIG. 10, may start determining which one of the regions, for example, within the two-dimensional map of FIG. 11 the coordinates (dv22(DL), dv22(DB)) belongs to, and may also start determining the acceleration value (ds22(DL)) exceeds, for example, any one of the one-dimensional threshold value of FIG. 12.

Note that the vertical axis a30(DB) of FIG. 13 may represent, in place of the first acceleration (deceleration a30), a square root of a sum of the square of the first acceleration (deceleration a30) and the square of the second acceleration, for example, in the leftward direction DB of the vehicle 100. The one-dimensional threshold value THF of FIG. 13 is prestored, for example, in the storage section 26 of FIG. 2.

(A), (B) and (C) FIG. 14 show examples of airbag control corresponding to severity of front collision, and (D) of FIG. 14 shows an example of control of the webbing 46 corresponding to severity of front collision. When the severity of front collision is high, the determination section 24 can activate substantially simultaneously the first and second inflators 21-1 and 21-2 of the airbag module 21 associated with the driver's seat. More specifically, as shown in (A) of FIG. 14, the determination section 24 activates the first inflator 21-1 at time T1 and then activates the second inflator 21-2 at time T2. An interval between time T2 and time T1 is, for example, 5 ms.

When the front collision is the first front-surface type front collision and more specifically corresponds, for example, to the vs.-pole frontal collision of FIG. 6C or the fourth region 481 of FIG. 9, time T1 in (A) of FIG. 14 corresponds, for example, to time t1 in FIG. 10. Further, time T2 in (A) of FIG. 14 corresponds to a time point that is, for example, 5 ms after time t1 in FIG. 10. Further, when the front collision is the second front-surface type front collision and more specifically corresponds, for example, to the ODB frontal collision of FIG. 6B or the sixth region 483 of FIG. 9, time T1 in (A) of FIG. 14 corresponds, for example, to time t2 in FIG. 10. Further, time T2 in (A) of FIG. 14 corresponds to a time point that is, for example, 5 ms after time t2 in FIG. 10.

When the severity of the front collision is low, the determination section 24 sets, for example, an interval between time T1 at which to activate the first inflator 21-1 of the airbag module 21 associated with the driver's seat and T4 at which to activate the second inflator 21-2 longer than an interval between time T2 and time T1 (see (B) of FIG. 14). The interval between time T4 and T1 is, for example, 40 ms. Note that the determination section 24 may change the interval between time T4 and T1 in accordance with the mode of the front collision. Further, the interval between time T2 and time T1 and the interval between time T4 and time T1 are prestored, for example, in the storage section 26 of FIG. 2. Alternatively, when the severity of the front collision is low, the determination section 24 may activate only the first inflator 21-1 at time T1 (see (C) of FIG. 14).

The severity of the front collision only has to be determined or confirmed, for example, by time T2. Namely, for example, the determination 24 can determine or confirm that the severity of the front collision is high, if the coordinates (dv30(DL), dv30(DB)) or coordinates (dv22(DL), dv22 (DB)) enter the region 481 or 483 of FIG. 9 or the region 484-2 of FIG. 11 by a particular time point that is, for example 5 ms after the initial or first deployment timing (time T1) determined in accordance with any one of the one-dimensional threshold values of FIG. 10, i.e. by time T2 (i.e., second deployment timing following the first deployment timing). If, on the other hand, the coordinates (dv30 (DL), dv30(DB)) or coordinates (dv22(DL), dv22(DB)) do not enter the region 481 or 483 of FIG. 9 or the region 484-2 of FIG. 11 by time T2, the determination section 24 can determine or confirm that the severity of the front collision is low.

The seat belt device of FIG. 2 includes, for example, a belt winding device (retractor) 44 and a buckle switch 48 in addition to the control unit 40 and the webbing 46. The belt winding device 44 of FIG. 2 includes, for example, the pretensioner 41, a lock mechanism 42, an electric motor 43 and a load determining mechanism 45. In the case where the determination section 24 determines severity of collision as above, the seat belt device can even more properly set restraining force (protecting force) with which the webbing 46 restrains the vehicle occupant.

At time t0 of FIG. 13, for example, the determination section 24 determines that front collision has occurred and outputs the determination result to the control unit 40. In accordance with the determination result, the control unit 40 not only drives the electric motor 43, for example, with a maximum electric current to pull the webbing 46 into the belt winding device 44, but also activates an inflator (not-shown) of the pretensioner 41 to pull the webbing 46 into the belt winding device 44. After that, the vehicle occupant starts moving in the forward direction DF, and thus, the control unit 40 activates the lock mechanism 42 so that one end of a torsion bar (not shown) of the load determining mechanism 45 is locked in such a manner that pulling-out of the webbing 46 is restricted. The load determining mechanism 45 includes, in addition to the torsion bar, a not-shown plate (EA plate) capable of absorbing energy. Thus, not only torsional deformation occurs in the torsion bar, but also resilient deformation occurs in the plate (EA plate).

By both of the torsion bar and the plate (EA plate) being selected, the restraining force (pullout load) F of the webbing 46 gradually increases, for example, from time T0 and then becomes substantially constant, as depicted by solid line in (D) of FIG. 14. A technique in which both of the torsion bar and the plate (EA plate) are selected when the vehicle occupant is heavy in weight, i.e. an adult, is disclosed, for example, in Japanese Patent Laid-open Publication No. 2011-07938.

Note, however, that, even where both of the torsion bar and the plate (EA plate) have been selected for the adult vehicle occupant prior to occurrence of front collision, the control unit 40 of FIG. 2 can control the load determining mechanism 45 in such a manner that only the torsion bar is selected after front collision has occurred and if the severity of the front collision is low. More specifically, the determination section 24 determines or confirms, for example at time T3 of (D) of FIG. 14, that the severity of the front collision is low, in response to which the control unit 40 causes, for example at time T3, the load determining mechanism 45 to disengage the plate (EA plate). Thus, for example at time T3, only the torsion bar is selected, and the restraining force (pullout load) F of the webbing 46 decreases as depicted by broken line in (D) of FIG. 14. Namely, for example after time T3, one of a plurality of restraining force F which corresponds to the severity of the front collision (broken line or solid line in (D) of FIG. 14) is determined or selected.

When the vehicle occupant is light in weight, i.e. a child, only the torsion bar is selected before front collision occurs, so that the restraining force of the webbing 46 increases for example from time T0 to a low level and then becomes substantially constant (one-dot chain line in (D) of FIG. 14). Of course, even where only the torsion bar has been selected for the child vehicle occupant prior to occurrence of front collision, the control unit 40 of FIG. 2 may change, after front collision has occurred and if the severity of the front collision is low, a strength with which to lock the opposite ends of the torsion bar, to thereby further decrease the low restraining force (one-dot chain line in (D) of FIG. 14).

Finally, it should be appreciated that the present invention is not limited to the above-described embodiments and that various modifications thereof are also possible without departing from the spirit of the invention so as to cover the scope recited in the appended claims.

What is claimed is:

1. A vehicle collision determination apparatus comprising:
 a first sensor provided in a front section of a vehicle, an output of the first sensor includes first acceleration in a backward direction of the vehicle and second acceleration in a rightward direction or a leftward direction;
 a second sensor provided in a passenger compartment of the vehicle, an output of the second sensor includes third acceleration in the backward direction and fourth acceleration in the rightward direction or the leftward direction;
 a determination section which determines, on a basis of the output of the first sensor, whether there has occurred a front collision of the vehicle, and when the determination section determines that the front collision of the vehicle has occurred, further determines a mode of the front collision among a plurality of modes of front collision by use of an integrated value of the first acceleration and an integrated value of the second acceleration,
 wherein,
 when the mode of the front collision is a predetermined mode among the plurality of modes of front collision, the determination section determines a severity of the front collision using integrated values of only the third acceleration and the fourth acceleration among the first acceleration, second acceleration, third acceleration, and fourth acceleration, and
 when the mode of the front collision is one of the plurality of modes of front collision other than the predetermined mode, the determination section determines the severity of the front collision using integrated values of only the first acceleration and the second acceleration among the first acceleration, second acceleration, third acceleration, and fourth acceleration.

2. The vehicle collision determination apparatus according to claim 1, wherein the determination section determines, in accordance with the severity of the front collision, one corresponding restraining force of a plurality of restraining forces, and the one restraining force is generated while a webbing provided in the vehicle is restraining a vehicle occupant following occurrence of the front collision.

3. The vehicle collision determination apparatus according to claim 1, wherein the determination section determines, in accordance with the mode of the front collision, whether a side airbag provided in the vehicle should be deployed or not.

4. The vehicle collision determination apparatus according to claim 3, wherein the determination section determines, in accordance with the mode of the front collision, timing at which the side airbag should be deployed.

5. The vehicle collision determination apparatus according to claim 1, which further comprises a third sensor provided in a side section of the vehicle, and wherein the determination section determines, in accordance with the mode of the front collision, whether deployment of the side airbag should be inhibited or not.

6. A vehicle collision determination apparatus comprising:
 a first sensor provided in a front section of the vehicle;
 a determination section which determines, on a basis of output of the first sensor, whether there has occurred a front collision of the vehicle, the output of the first sensor having first acceleration in a backward direction of the vehicle and second acceleration in a rightward direction or a leftward direction, the determination section determining severity of the front collision by use of an integrated value of the first acceleration and an integrated value of the second acceleration, wherein the determination section determines a mode of the front collision; and
 a second sensor provided in a passenger compartment of the vehicle, output of the second sensor having third acceleration in the backward direction and fourth acceleration in the rightward direction or the leftward direction, and wherein, upon determination that the mode of the front collision is a predetermined mode, the determination section determines the severity of the front collision by use of an integrated value of the third acceleration and an integrated value of the fourth acceleration,
 wherein the determination section determines, in accordance with the mode of the front collision, one corresponding timing of a plurality of timing, the determination section determines, by use of the integrated value of the third acceleration, whether current time is the one timing corresponding to the determined mode, and the one timing corresponding to the determined mode is first deployment timing for first deploying an airbag associated with a driver's seat and/or an airbag associated with an assistant driver's seat.

7. The vehicle collision determination apparatus according to claim 6, wherein the determination section determines second deployment timing, succeeding the first deployment timing, in accordance with the severity of the front collision determined by use of the integrated value of the third acceleration and the integrated value of the fourth acceleration.

* * * * *